(12) United States Patent
Lazzara et al.

(10) Patent No.: US 10,814,584 B2
(45) Date of Patent: Oct. 27, 2020

(54) KITS AND METHODS FOR FIBER COMPOSITES INCLUDING PARTIALLY-CURED RESINOUS MATERIALS FOR THE REINFORCEMENT OF PHYSICAL STRUCTURES

(71) Applicant: Neptune Research, LLC, Riviera Beach, FL (US)

(72) Inventors: Christopher J. Lazzara, Palm Beach, FL (US); Davie Peguero, Lake Park, FL (US); Richard J. Lazzara, Palm Beach, FL (US); Venkatachala S. Minnikanti, Delray Beach, FL (US)

(73) Assignee: Neptune Research, LLC, Riviera Beach, FL (US)

( * ) Notice: Subject to any disclaimer, the term of this patent is extended or adjusted under 35 U.S.C. 154(b) by 634 days.

(21) Appl. No.: 14/804,683

(22) Filed: Jul. 21, 2015

(65) Prior Publication Data
US 2015/0321448 A1    Nov. 12, 2015

Related U.S. Application Data

(63) Continuation of application No. 14/603,176, filed on Jan. 22, 2015.
(Continued)

(51) Int. Cl.
*B32B 5/12* (2006.01)
*F16L 55/168* (2006.01)
(Continued)

(52) U.S. Cl.
CPC ............ *B32B 5/12* (2013.01); *B29C 35/0272* (2013.01); *B29C 73/10* (2013.01); *B32B 38/00* (2013.01);
(Continued)

(58) Field of Classification Search
CPC ..... B32B 5/12; B32B 38/00; B32B 2262/106; B32B 2556/00; B32B 2038/0056;
(Continued)

(56) References Cited

U.S. PATENT DOCUMENTS

| | | | |
|---|---|---|---|
| 3,669,158 A | 6/1972 | Phillips | |
| 4,038,239 A * | 7/1977 | Coyner | C08G 18/0885 521/42 |

(Continued)

FOREIGN PATENT DOCUMENTS

| | | |
|---|---|---|
| EP | 0 507 220 | 10/1992 |
| EP | 1028095 | 8/2000 |

(Continued)

OTHER PUBLICATIONS

Aquawrap(r) product information (Year: 2008).*
(Continued)

*Primary Examiner* — Camie S Thompson
(74) *Attorney, Agent, or Firm* — Duane Morris LLP

(57) ABSTRACT

A composite system for the reinforcement of physical structures includes a plurality of unidirectional fibers arranged with respective longitudinal axes generally parallel to each other over a substantial portion of a length of each unidirectional fiber. The plurality of unidirectional fibers are non-mechanically connected. A resinous material adheres the plurality of unidirectional fibers to each other such that each one of the plurality of unidirectional fiber is adhered to at least one adjacent one of the plurality of unidirectional fibers along a substantial portion of the length of the adjacent one of the plurality unidirectional fibers.

27 Claims, 10 Drawing Sheets

Related U.S. Application Data

(60) Provisional application No. 61/930,796, filed on Jan. 23, 2014, provisional application No. 61/985,058, filed on Apr. 28, 2014.

(51) Int. Cl.
| | |
|---|---|
| *D06M 15/564* | (2006.01) |
| *B65B 5/04* | (2006.01) |
| *B65B 63/02* | (2006.01) |
| *B32B 38/00* | (2006.01) |
| *B65D 85/08* | (2006.01) |
| *C08J 5/24* | (2006.01) |
| *B29C 35/02* | (2006.01) |
| *B29C 73/10* | (2006.01) |
| *F16L 9/04* | (2006.01) |
| *F16L 9/08* | (2006.01) |
| *F16L 9/128* | (2006.01) |
| *D06M 101/40* | (2006.01) |
| *B29C 35/08* | (2006.01) |

(52) U.S. Cl.
CPC .............. *B65B 5/04* (2013.01); *B65B 63/024* (2013.01); *B65D 85/08* (2013.01); *C08J 5/24* (2013.01); *D06M 15/564* (2013.01); *F16L 9/042* (2013.01); *F16L 9/085* (2013.01); *F16L 9/128* (2013.01); *F16L 55/1683* (2013.01); *F16L 55/1686* (2013.01); *B29C 2035/0827* (2013.01); *B29C 2035/0877* (2013.01); *B32B 2038/0056* (2013.01); *B32B 2038/0076* (2013.01); *B32B 2260/023* (2013.01); *B32B 2260/046* (2013.01); *B32B 2262/106* (2013.01); *B32B 2305/076* (2013.01); *B32B 2305/10* (2013.01); *B32B 2305/77* (2013.01); *B32B 2309/60* (2013.01); *B32B 2310/0409* (2013.01); *B32B 2375/00* (2013.01); *B32B 2405/00* (2013.01); *B32B 2556/00* (2013.01); *C08J 2363/00* (2013.01); *C08J 2375/04* (2013.01); *D06M 2101/40* (2013.01)

(58) Field of Classification Search
CPC ...... B32B 2038/0076; B32B 2305/076; B32B 2305/10; B32B 2260/023; B32B 2405/00; B32B 2305/77; B32B 2260/046; B32B 2309/60; B32B 2310/0409; B32B 2375/00; F16L 9/042; F16L 9/128; F16L 9/085; F16L 55/1686; F16L 5/1683; F16L 5/1686; F16L 55/16; F16L 58/1063; B29C 35/0272; B29C 73/10; B29C 2035/0827; B29C 2035/0877; B29C 65/5014; D06M 15/564; D06M 2101/40; B65B 5/04; B65B 63/024; B65D 85/08; C08J 5/24; C08J 2363/00; C08J 2375/04; Y10T 442/2746; B29K 2075/00; B29K 2307/04
USPC .............. 428/298.1, 281.1, 62; 156/94, 293; 114/227; 29/409.9; 427/140; 442/150; 138/99, 97
See application file for complete search history.

(56) References Cited

U.S. PATENT DOCUMENTS

| | | | |
|---|---|---|---|
| 4,519,856 A | 5/1985 | Lazzara | |
| 4,560,428 A | 12/1985 | Sherrick | |
| 4,756,337 A | 7/1988 | Settineri | |
| 5,030,493 A | 7/1991 | Rich | |
| 5,726,222 A | 3/1998 | Sawaoka | |
| 5,732,743 A | 3/1998 | Livesay | |
| 5,786,437 A | 7/1998 | Nicholas | |
| 5,894,864 A | 4/1999 | Rich | |
| 6,386,236 B1 | 5/2002 | Buckley | |
| 6,620,471 B1 | 9/2003 | Do | |
| 7,513,275 B2 | 4/2009 | Lazzara | |
| 8,137,798 B2 | 3/2012 | Arai | |
| 8,522,827 B2 | 9/2013 | Lazzara | |
| 8,844,464 B2 | 9/2014 | Lazzara | |
| 9,096,020 B2 | 8/2015 | Lazzara | |
| 2002/0106464 A1 | 8/2002 | Bazinet | |
| 2003/0113531 A1 | 6/2003 | Hajmrle | |
| 2010/0147409 A1* | 6/2010 | Lu ...................... | F16L 55/1683 138/99 |
| 2010/0237606 A1 | 9/2010 | Lazzara | |
| 2011/0272082 A1 | 11/2011 | Dunleavy et al. | |
| 2012/0001393 A1 | 1/2012 | Lazzara | |
| 2012/0156378 A1 | 6/2012 | Lazzara | |
| 2013/0078473 A1* | 3/2013 | Kollbach ........... | C08G 18/4238 428/423.1 |
| 2013/0101762 A1 | 4/2013 | Malis | |
| 2013/0157060 A1 | 6/2013 | Komori | |
| 2013/0160926 A1 | 6/2013 | Lazzara et al. | |
| 2013/0168398 A1 | 7/2013 | Kreger | |
| 2014/0011016 A1 | 1/2014 | Vaimisetti | |
| 2014/0048164 A1 | 2/2014 | Souza | |
| 2015/0068633 A1 | 3/2015 | Lazzara | |
| 2015/0098833 A1 | 4/2015 | Pointer | |
| 2015/0204476 A1 | 7/2015 | Lazzara | |
| 2015/0299941 A1 | 10/2015 | Lazzara | |
| 2015/0353770 A1 | 12/2015 | Burckhardt | |
| 2016/0320156 A1 | 11/2016 | Curliss | |

FOREIGN PATENT DOCUMENTS

| | | | | |
|---|---|---|---|---|
| WO | WO 92/17331 | | 10/1992 | |
| WO | WO 92/17331 A1 | | 10/1992 | |
| WO | WO-9217331 A1 * | | 10/1992 | ............... B32B 5/08 |
| WO | WO 2012/010276 | | 1/2012 | |
| WO | WO 2012/040276 A1 | | 3/2012 | |
| WO | 2014/196607 | | 12/2014 | |

OTHER PUBLICATIONS

International Search Report for International Application No. PCT/US16/14115 dated Apr. 29, 2016, 3 pages.
Written Opinion for International Application No. PCT/US16/14115 dated Apr. 29, 2016, 24 pages.
Lenoe, E.M., "Effect of Voids on Mechanical Properties of Graphite Fiber Composites," prepared by AVCO Corporation, prepared for the U.S. Naval Air Systems Command, Contract No. N00019-07-C-0242, 1970, 55 pages.
Suhot, M.A. et al., "The Effect of Voids on the Flexural Fatigue Performance of Unidirectional Carbon Fibre Composites," 16th International Conference on Composite Materials, 2007, 10 pages.
Rueda, S.H., "Curing, Defects and Mechanical Performance of Fiber-Reinforced Composites," Universidad Politecnica De Madrid, Escuela Tecnica Superior de Ingenieros de Caminos, Canales y Puertos, Apr. 2013, 198 pages.
Solar-Wrap, UV-Curable Composite Repair System, Specification Sheet, Neptunre Research, Inc., available prior to Sep. 2013, 1 page.
Syntho-Glass XT, Extreme Strength Fiberglass Composite System, Specification Sheet, Neptune Research, Inc., available prior to Sep. 2013, 2 pages.
Syntho-Glass, Fiberglass Water-Activated Composite Solution, Specification Sheet, Neptune Research, Inc., available prior to Sep. 2013, 2 pages.
Syntho-Glass NP, Non-Pressure Leak Repair Kit, Specification Sheet, Neptune Research, Inc., available prior to Sep. 2013, 1 pages.
Syntho-Poxy HC- Two-Part Epoxy Coumpound, Specification Sheet, Neptune Research, Inc., available prior to Sep. 2013, 1 pages.
Thermo Wrap CF, Carbon Fiber Composite Repair System For High Temperature And Process Piping, Specification Sheet, Neptune Research, Inc., available prior to Sep. 2013, 1 pages.

(56) References Cited

OTHER PUBLICATIONS

Thermo Wrap, Composite Repair System For High Temperature And Process Piping, Specification Sheet, Neptune Research, Inc., available prior to Sep. 2013, 1 pages.
Titan 118, Carbon Fiber Structural Repair System, Specification Sheet date prior to Sep. 2014, 1 pages.
Titan 218, Carbon Fiber Structural Repair System, Specification Sheet, Neptune Research, Inc., available prior to Sep. 2013, 1 pages.
Titan Saturant Epoxy, Specification Sheet, Neptune Research, Inc., available prior to Sep. 2013, 1 pages.
Trans-Wrap, Carbon Fiber Pipeline Repair System, Specification Sheet, Neptune Research, Inc., available prior to Sep. 2013, 1 pages.
Viper Skin, Carbon Fiber Composite Reinforcement System, Specification Sheet, Neptune Research, Inc., available prior to Sep. 2013, 2 pages.
Syntho-Glass 24, Pipe Wrap and Pipeline Repair Product, Specification Sheet, Neptune Research, Inc., available prior to Sep. 2013, 1 page.
International Search Report for International Application No. PCT/US2015/012522, dated May 4, 2015, 4 pages.
Written Opinion for International Application No. PCT/US2015/012522, dated May 4, 2015, 8 pages.
Syntho-Glass® Website, available prior to Nov. 2, 2017, in U.S. Appl. No. 14/603,176 (4 pages).
Wayback Verification of Syntho-Glass and Viper Skin, available prior to Nov. 2, 2017, in U.S. Appl. No. 14/603,176 (2 pages).
Syntho-Glass® XT Product Sheet, available prior to Nov. 2, 2017, in U.S. Appl. No. 14/603,176 (2 pages).
Viper-Skin™ Product Sheet, available prior to Nov. 2, 2017, in U.S. Appl. No. 14/603,176 (2 pages).

\* cited by examiner

KITS AND METHODS FOR FIBER COMPOSITES INCLUDING PARTIALLY-CURED RESINOUS MATERIALS FOR THE REINFORCEMENT OF PHYSICAL STRUCTURES

CROSS-REFERENCE TO RELATED APPLICATIONS

This application is a continuation of U.S. patent application Ser. No. 14/603,176, filed Jan. 22, 2015, which claims priority to and the benefits of U.S. Patent Application No. 61/930,796, filed Jan. 23, 2014, and U.S. Patent Application No. 61/985,058, filed Apr. 28, 2014, each of which are hereby incorporated by reference herein in their entireties.

TECHNICAL FIELD

The present disclosure relates generally to the repair and reinforcement of structures, and more particularly to composite systems for the repair and reinforcement structures.

BACKGROUND

Conduit assemblies, such as pipelines and hydraulic circuits, are used to transport an assortment of fluids, such as water, oil, various natural and synthetic gases, sewage, slurry, hazardous materials, and the like. Similar structures are utilized for transmitting electrical and fiber optic cabling across vast expanses of land in establishing telecommunication networks. Conduit assemblies are formed from a variety of materials, including, for example, concrete, plastic (e.g., polyvinyl chloride, polyethylene), and various metallic materials, such as iron, copper, and steel. Containment structures, such as storage tanks, are used to store an assortment of fluids, such as oil, water, chemicals, various natural and synthetic fluids, sewage, hazardous materials, and the like. Containment structures are formed from a variety of materials, including concrete, plastic, and metallic materials, such as iron, copper, aluminum, and steel. Structures used to support various building, industrial, and highway structures, such as columns and beams, are constructed from various construction materials, such as wood, reinforced concrete, unreinforced concrete, aluminum, iron, and steel.

Conduit assemblies, containment structures, building structures, and highway structures are often exposed to harsh environments and are often under loads that can cause the assemblies and structures to degrade to the point of needing to be repaired or structurally reinforced. Thus, there is a need for improved repair and reinforcement systems that are quick, versatile, durable, minimally disruptive, and cost-effective.

SUMMARY

According to one aspect of the present invention, a composite system for the reinforcement of physical structures comprises a plurality of unidirectional fibers each having a longitudinal axis and a length. The plurality of unidirectional fibers are of approximately equal length and arranged with the respective longitudinal axes generally parallel to each other over a substantial portion of the length of each unidirectional fiber. The plurality of unidirectional fibers are non-mechanically connected. A resinous material adheres the plurality of unidirectional fibers to each other such that each one of the plurality of unidirectional fiber is adhered to at least one adjacent one of the plurality of unidirectional fibers along a substantial portion of the length of the adjacent one of the plurality unidirectional fibers.

According to another aspect of the present invention, a method of manufacturing a composite system for the reinforcement of physical structures includes a plurality of unidirectional fibers and a resinous material adhering the plurality of unidirectional fibers to each other. The method comprises providing a first supply roll including a disposable applicator film. A first plurality of individual supply spools of first unidirectional fibers is provided. Each unidirectional fiber has a first longitudinal axis. The first individual supply spools of first unidirectional fibers are arranged adjacent to each other. The disposable applicator film is extended from the first supply roll to a second collector roll. The first unidirectional fibers are extended from the first individual supply spools such that the first unidirectional fibers are parallel to each other and are disposed above or below the disposable applicator film. During the extending of the disposable applicator film and the extending of the first unidirectional fibers, the resinous material is applied to the first unidirectional fibers along the width of each of the first unidirectional fibers such that the resinous material is generally evenly applied and impregnates the first unidirectional fibers such that the first unidirectional fibers adhere to each other. The resin impregnated first unidirectional fibers are placed on the disposable applicator film. The adhered first unidirectional fibers are generally parallel to each other. Each of the first unidirectional fibers are adhered to at least one adjacent one of the first unidirectional fibers along a substantial portion of the adjacently adhered fibers such that the first unidirectional fibers are non-mechanically bound to each other.

In a yet another aspect of the present invention, a composite system for the reinforcement of physical structures comprises a plurality of first unidirectional fibers each having a first longitudinal axis and a first length. The plurality of first unidirectional fibers are of approximately equal length and arranged with the respective first longitudinal axes generally parallel to each other over a substantial portion of the first length of each first unidirectional fiber. A plurality of second unidirectional fibers each having a second longitudinal axis and a second length. The plurality of second unidirectional fibers are of approximately equal length and arranged with the respective second longitudinal axes generally parallel to each other over a substantial portion of the second length of the second unidirectional fibers. The second length is less than the first length. A resinous material adheres the plurality of first unidirectional fibers to each other such that each of the plurality of first unidirectional fibers is adhered to at least one adjacent one of the plurality of first unidirectional fibers along a substantial portion of the first length of the adjacent first unidirectional fibers thereby forming a first unidirectional fiber layer of generally non-mechanically connected first unidirectional fibers to define a first plane. The resinous material further adheres the plurality of second unidirectional fibers to each other such that each of the plurality of second unidirectional fibers is adhered to at least one adjacent one of the plurality of second unidirectional fibers along a substantial portion of the second length of the adjacent second unidirectional fibers thereby forming a second unidirectional fiber layer of generally non-mechanically connected second unidirectional fibers to define a second plane. The plurality of second unidirectional fibers are oriented such that any one of the second longitudinal axes in the second plane is skew to any one of the first longitudinal axes in the first plane. The first unidirectional fiber layer and the second unidirectional fiber layer are non-mechanically connected.

In a yet another aspect of the present invention, a composite system for the reinforcement of physical structures comprises a first unidirectional fiber layer including a plurality of non-mechanically connected first unidirectional fibers each having a first longitudinal axis and a first length. The plurality of first unidirectional fibers are of approximately equal length and arranged with the respective first longitudinal axes generally parallel to each other over a substantially the entire first length of each first unidirectional fiber. The plurality of first unidirectional fibers include electrically and/or heat conductive materials. The plurality of first unidirectional fibers are adhered to each other by a resinous material such that each of the plurality of first unidirectional fibers is adhered to at least one adjacent one of the plurality of first unidirectional fibers along substantially the entire first length of an adjacent first unidirectional fiber. A second insulating fiber layer is adhered to the first unidirectional fiber layer by the resinous material and/or another resinous material. The second insulating layer separates the electrically and/or heat conductive material(s) in the first unidirectional fiber layer from direct contact with an electrically and/or heat conductive physical structure being reinforced by the composite system.

Additional aspects of the invention will be apparent to those of ordinary skill in the art in view of the detailed description of various embodiments, which is made with reference to the drawings, a brief description of which is provided below.

Figure 1A:
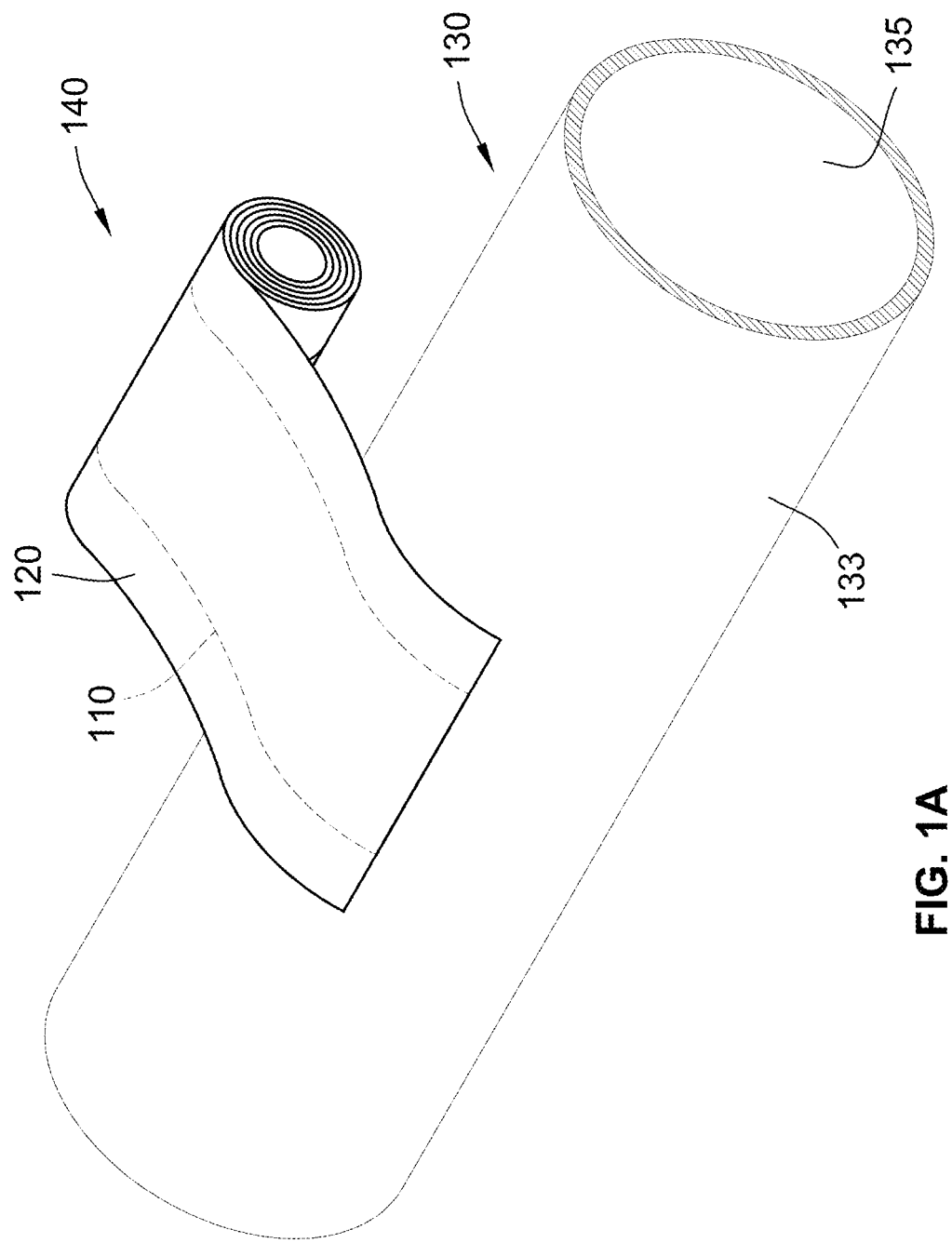
FIGS. 1A-1C illustrate an application of a unidirectional fiber composite system for reinforcing an exemplary physical structure in accordance with aspects of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation."

Figure 1B:
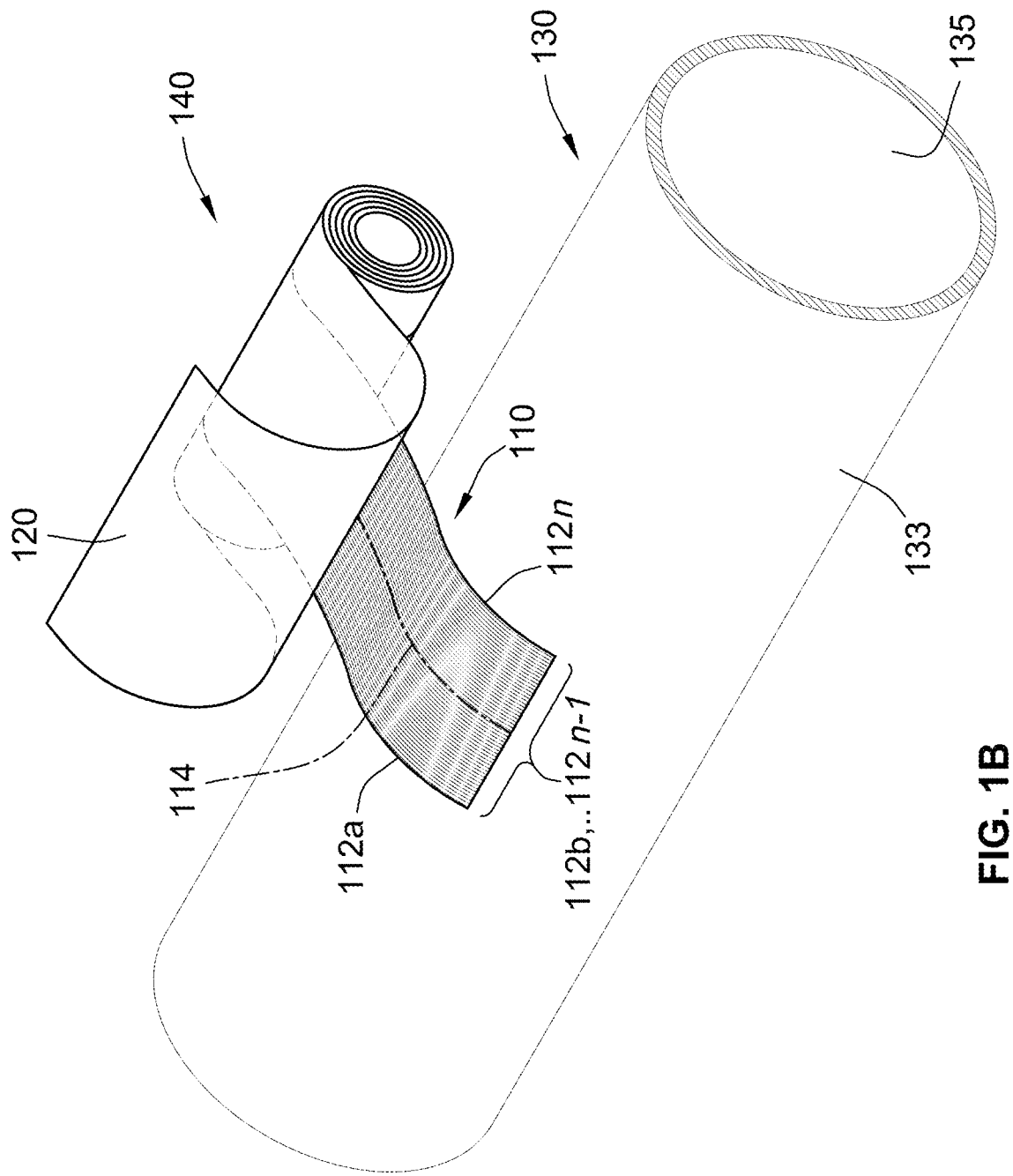
Figure 1C:
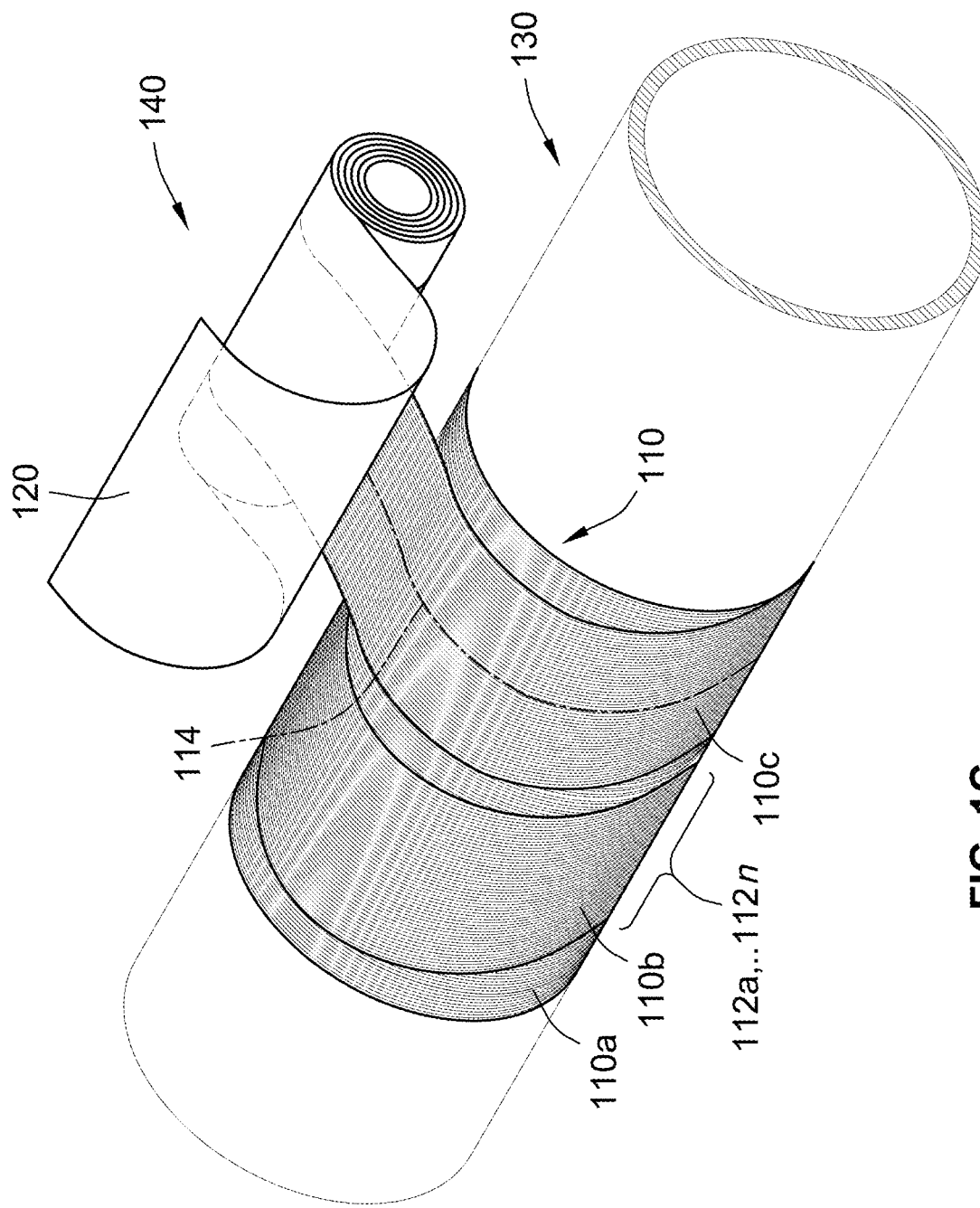

Referring now to FIGS. 1A-1C, an exemplary aspect of a unidirectional fiber composite system is illustrated for reinforcing a physical structure 130, which in this instance, is shown with the unidirectional fiber composite system being applied around an outer surface 133 of a metal pipe. A unidirectional fiber composite system includes a plurality of unidirectional fibers, such as unidirectional fibers 112a-112n, each having a longitudinal axis and a length, that in the case of FIGS. 1A-1C, are arranged to be parallel to the long or longitudinal axis 114 of the unidirectional fiber composite system 110. The plurality of unidirectional fibers 112a-112n are of an approximately equal length and are arranged with their respective longitudinal axes generally parallel to each other over a substantial portion of the length of each unidirectional fiber.

The plurality of unidirectional fibers are non-mechanically connected using a resinous material that adheres the plurality of unidirectional fibers to each other. For example, in some aspects, the resinous material causes or provides an initial level of stickiness between the unidirectional fibers, such as through a thick viscosity of the resin, that provides some mechanical integrity initially while the resin is in the uncured state but when the resin cures it transitions into a hard matrix once curing is finished so that there is essentially a non-mechanical connection (e.g., no direct mechanical connection) between the unidirectional fibers, and instead the cured resin matrix holds or bonds the unidirectional fibers together. In other aspects, such as with select epoxy resins, the unidirectional fibers may, for the most part, be held or bonded to each other via the hard or semi-hardened resin matrix before the resin has fully cured. Each one (or almost every one) of the plurality of unidirectional fibers is adhered to an adjacent one of the plurality of unidirectional fibers along a substantial portion of the length of the adjacent unidirectional fiber. In some aspects, the plurality of unidirectional fibers of the composite system are generally parallel to each other and have an uncured resinous material adhering them together. The plurality of unidirectional fibers 112a-112n can be placed such that the fibers rest on a disposable plastic applicator film 120 (e.g., adhered through the stickiness of a thick viscous resin in an uncured state) that can assist with the manufacturing, storage, and application of the resinous unidirectional fiber composite system. For example, an unused unidirectional fiber composite system can be stored as a rolled-up kit 140 that can be unrolled as the unidirectional fibers adhered via the resinous material are applied to a physical structure (e.g., containment systems, pipelines and conveyance systems, or load bearing structures such as columns or beams, metal structures, concrete structures) and the applicator film 120 is separated from the unidirectional fibers 112a-112n.

In FIG. 1B, after initially unrolling the rolled-up kit 140 where resin impregnated unidirectional fibers 112a-112n rest on the applicator film 120, the uncured, resin-impregnated unidirectional fibers 112a-112n are then applied to the physical structure 130 (e.g., the metal pipe). The plastic applicator film 120 can be a disposable film which is partially removed as further illustrated between FIGS. 1B and 1C as the resin-impregnated unidirectional fibers 112a-

112*n* of the composite system 110 are wrapped around the structure. The adhered unidirectional fibers 112*a*-112*n* then continue to be wrapped as illustrated in FIG. 1C.

In some aspects, a single layer of adhered unidirectional fibers may be applied to the structure. In another aspect, multiple generally overlying layers of adhered unidirectional fibers can be applied from a single continuous roll or from multiple rolls of the unidirectional fiber composite systems. For example, from the same continuous roll that is applied in FIG. 1C, a first layer 110*a* of adhered resin-impregnated unidirectional fibers are overlain by a second layer 110*b*, 110*c* also applied from the same continuous roll. The unidirectional fiber composite system can also be wrapped around a structure using partially offset, overlapping layers. The application of the composite system to a structure and the type of composite system will vary depending on the desired properties and extent of the structural repair or reinforcement.

In some desirable aspects of a unidirectional fiber composite system, the unidirectional fibers are non-mechanically connected, such that there is no direct mechanical connection between adjacent fibers. For example, the fibers may be adhered through impregnation of the unidirectional fibers with a resinous material, such as a polyurethane or epoxy resin. The resinous material used to adhere the plurality of generally parallel unidirectional fibers may also be used to adhere or otherwise attach the unidirectional fiber composite system to the physical structure being repaired or reinforced. By adhering unidirectional fibers together such that they are generally parallel to one another, the uniqueness of the alignment of the unidirectional fibers to one another is maximized and allows for the generally straight alignment of the adhered unidirectional fibers in the composite system.

One beneficial aspect of maintaining the straight alignment of the fibers in the composite system is that the tensile properties of the plurality of unidirectional fibers are maximized by minimizing kinking, bending, or otherwise weakening their tensile strength. Maintaining the generally straight alignment further offers the benefit of minimizing the thickness of the composite system for the reinforcement of the physical structure. For example, each layer of reinforcement wrapped over or around a given cross-section of reinforced structure (e.g., a pipe, a column) minimally increases the cross-sectional dimension of the structure. The increase in cross-section for a repair or reinforcement is generally due to the increase in diameter (for example, for a circular pipe or column) caused by the unidirectional fibers or the layering of unidirectional fibers used in the composite system. Thus, a desirable aspect of having a composite system where the tensile stiffness and strength properties of the fibers can be maximized is that the quantity of fibers needed to obtain the desired reinforcement properties is decreased.

Some non-limiting examples of unidirectional fibers that can be used for a unidirectional fiber composite system include carbon fibers (e.g., both pan and pitch based), glass fibers (e.g., fiber glass), basalt fibers, aramid fibers, metal fibers, or any combinations thereof.

Some non-limiting example of resins used to adhere adjacent unidirectional fibers and to adhere overlying unidirectional fiber layers include polyurethane, polyurea, epoxy, polyimide, polyoxazolidones, silanes, vinyl ester resins, and/or any one, two, or multicomponent resin systems. In some aspects, it is desirable for the resins to initially be in an uncured or partially cured state prior to the composite system being applied to structure targeted for reinforcement. Then the resin can be configured to subsequently cure into a rigid or semi-rigid state after the composite system has been applied to the structure. In some aspects, the resins include a polyurethane material having an aliphatic prepolymer. In some aspects, the resins can include a polyurethane material having an aliphatic isocyanate prepolymer. In some aspects, the resins can include a polyurethane material having an isocyanate prepolymer. In some aspects, the resins (e.g., one with an aliphatic isocyante prepolymer) include a polyurethane material chemically configured to activate and harden after removal from a generally inert environment and exposure to humid air, moisture-borne air, or an environment that otherwise provided moisture to activate the resin.

Other non-limiting exemplary aspects of resins contemplated for the unidirectional fiber composite system include the resins described in U.S. Pat. No. 4,519,856, issued May 28, 1985, entitled, "Resin-Cloth Structural System"; U.S. Pat. No. 5,030,493, issued Jul. 9, 1991, entitled, "High Strength Resin-Cloth Structural System"; U.S. Pat. No. 8,522,827, issued Sep. 3, 2013, entitled, "Protective Seal For A Pipeline Assembly"; U.S. Patent Application Publication No. 2010/0237606, published Sep. 23, 2010, entitled, "End Seal For A Pipeline"; U.S. Patent Application Publication No. 2012/0001393, published Jan. 5, 2012, entitled, "Deformable Composite Plug"; U.S. Patent Application Publication No. 2012/156378, published Jun. 21, 2012, entitled, "Systems, Methods, and Device For Applying Fluid Composites To Carrier Sheets"; and U.S. Patent Application Publication No. 2013/0160926, published Jun. 27, 2013, entitled, "Systems, Methods, and Device For Strengthening Fluid System Components Using Radiation-Curable Composites"; the disclosures of which are each hereby incorporated by reference herein in their entireties.

Other non-limiting aspects of resins contemplated for unidirectional fiber composite systems include the resins incorporated into the resin-impregnated products manufactured and sold by Neptune Research, Inc. of Riviera Beach, Fla., USA (formerly located in Lake Park, Fla., USA), including the resins and/or the resins in the resin-impregnated products available under the trade names SYNTHO-GLASS®, SYNTHO-GLASS® NP, SYNTHO-GLASS® 24, SYNTHO-GLASS XT®, VIPER-SKIN®, TITAN® 118, TITAN® 218, TRANS-WRAP™, TITAN® SATURANT EPDXY, THERMO-WRAP™, THERMO-WRAP™ CF, SOLAR-WRAP™, and SYNTHO-PDXY™ HC.

A unidirectional fiber composite system with uncured resins can be stored or packaged as part of a repair kit in a moisture-tight and sealed pouch. The composite system kit can have a wide range of storage temperatures that will typically be determined by the type of resin used to adhere the unidirectional fibers and a temperature range that retains the resin in its uncured state prior to a repair or reinforcement application.

In some aspects, it is contemplated that the resin to unidirectional fiber ratios, by volume, range from about 80:20 to 20:80. In some aspects, the resin to fiber ratio, by volume, ranges from about 60:40 to 20:80. In some aspects, the composite system width (e.g., the entire width of the fiber tape illustrated in FIG. 1B from fiber 112*a* through 112*n*) can range from approximately ½ inch to approximately 24 inches (approximately 1 cm to approximately 60 cm), where the width will vary depending on the application. For composite systems based on unidirectional carbon fibers, the modulus of elasticity of the composite system can range from between about 12 to about 150 megapounds per square inch (Msi) (about 82 GPa to about 1034 GPa). For composite systems based on unidirectional glass fibers, the modulus of elasticity of the composite system can range from about 5 to about 13 Msi (about 34 GPa to about 90 GPa).

A single layer of a unidirectional fiber composite system 110 will have a thickness that varies primarily based on the fiber thickness and secondary on the type of resin. In some aspects, a unidirectional fiber composite system can have a thickness of less than about 1/16 of an inch (less than about 2 mm). In some aspects, a unidirectional fiber composite system has a thickness less than or equal to about 100 mils (less than or equal to about 2.5 mm), less than or equal to about 50 mils (less than or equal to about 1.3 mm), less than or equal to about 25 mils (less than or equal to about 0.6 mm), less than or equal to about 15 mils (less than or equal to about 0.4 mm), less than or equal to about 10 mils (less than or equal to about 0.3 mm), less than or equal to about 5 mils (less than or equal to about 0.1 mm), between the range of about 50 to 100 mils (about 1.3 to 2.5 mm), between the range of about 25 to 50 mils (about 0.6 to 1.3 mm), between the range of about 10 to 25 mils (about 0.3 to 0.6 mm), and/or between the range of about 5 to 10 mils (about 0.1 to 0.3 mm).

As demonstrated by some of the desirable thickness and strength aspects of a unidirectional fiber composite system, such systems provide a high stiffness and high strength reinforcement system that minimizes the increase in thickness of the reinforced or repaired structure, even for applications where multiple layers of composite unidirectional fibers are applied to the portion of the structure being repaired or reinforced.

The different types of structures and geometries to which the described composite system may be applied to include steel columns (e.g., flange, hollow tube, hollow square, hollow rectangular cross-sections); concrete columns (e.g., circular, oval, square, rectangular cross-section); concrete or steel beams; other load bearing structures made of steel, wood or concrete; pipes; pipelines; storage tanks; other containment structures; concrete walls; and/or concrete slabs. Concrete structures can include reinforced or unreinforced concrete structures. A unidirectional fiber composite system can be applied either to the inside of a structure (e.g., inside the pipe of a pipeline) or externally (e.g., the exterior of a pipe, bonded to the exterior of a concrete structure, bonded to the flange of a steel column).

In some aspects, resins contemplated for a unidirectional fiber composite system are curable under water or in the air. It is further contemplated that in some aspects resins can be cured at temperatures above 400 degree F. or below 50 degrees F. In some aspects, resins for the described composite system can be moisture cured, aqueous solution cured, light cured (e.g., UV light curable), electron-beam cured, or heat cured (e.g., thermoset).

In one exemplary aspect, the unidirectional fiber composite system is made with carbon fibers that are arranged such that the carbon fibers are generally parallel to each other prior to a resinous material being applied to the fibers. In some aspects, individual carbon fibers have a diameter that is between about 0.0001 inches and 0.005 inches (between about 2.5 micrometers and 127 micrometers). In some aspects, individual carbon fibers have a diameter value that is between about 0.0002 inches and 0.0004 inches (between about 5 micrometers and about 254 micrometers). Other fibers of other diameters are also contemplated. For example, in some aspects, a unidirectional fiber composite system is made with glass fibers (e.g., fiberglass) that are arranged such that the glass fibers are generally parallel to each other prior to a resinous material being applied to the fibers. In some aspects, individual glass fibers can have a diameter value that is between about 0.0002 inches and 0.001 inches (between about 5 micrometers and 25 micrometers). In some aspects, a unidirectional fiber composite system is made with basalt fibers that are arranged such that the basalt fibers are generally parallel to each other prior to a resinous material being applied to the fibers. In some aspects, individual basalt fibers can have a diameter that is between about 0.0002 inches and 0.001 inches (between about 5 micrometers and 25 micrometers). Prior to fabricating an uncured unidirectional fiber composite system and applying the resinous material, the unidirectional fibers can be stored on supply spools from which the unidirectional fibers would be extended such that the fibers are generally parallel to each other during the manufacturing of the described composite systems (see FIG. 4).

Figure 2:
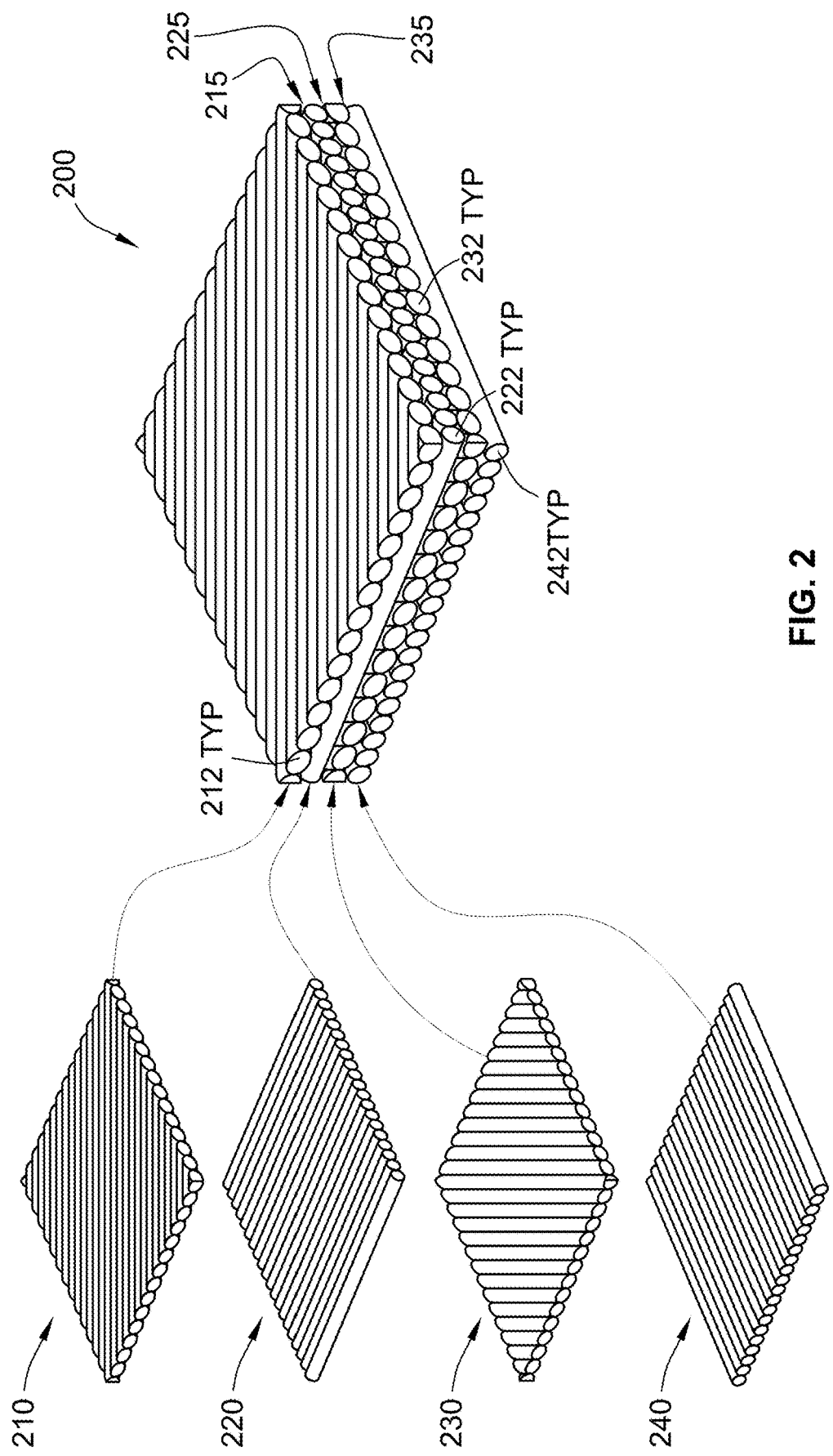
FIG. 2 illustrates an exemplary multi-layer unidirectional fiber composite system for reinforcing physical structures in accordance with aspects of the present invention.

Referring now to FIG. 2, an exemplary multi-layer unidirectional fiber composite system 200 for reinforcing physical structures is illustrated. The system includes a plurality of unidirectional fiber layers (e.g., 210, 220, 230, 240) adhered to each other (e.g., connected by a layer of resin), with the fibers in each layer of unidirectional fibers being oriented at different angles to the fibers in the adjacent layer. In some aspects, the fibers between adjacent layers are oriented in approximately the same direction (not illustrated). In contrast to a woven fabric that has interwoven fibers at different angles to each other, the individual unidirectional fiber layers (e.g., 210, 220, 230, 240) in FIG. 2 are each distinct layers that are non-mechanically connected (e.g., without any entanglement or direct connection between the fibers of the distinct layers). In some aspects, resinous materials, such as those described elsewhere herein, are used to adhere or bond the unidirectional fiber layers (e.g., 210, 220, 230, 240) to each other.

Each of the unidirectional fiber layers (e.g., 210, 220, 230, 240) of the multi-layer unidirectional fiber composite system 200 can be pressed together or otherwise laminated or adhered, such as through the same or similar resinous materials that adhere the individual fibers together for the respective distinct unidirectional fiber layers (e.g., 210, 220, 230, 240). As illustrated in FIG. 2, the individual fibers (e.g., 212, 222, 232, 242) of each respective layer (e.g., 210, 220, 230, 240) are skew to the fibers in the unidirectional fiber layer immediately above or below. While the angle of the skew will vary depending on the reinforcement application, for illustrative purposes the individual fibers between the adjacent layers are skewed by approximately 45 degrees from the fibers in the adjacent layer. To maintain the individual strength that each layer possess along the direction parallel to each layers respective unidirectional fibers, the interface (e.g., 215, 225, 235) between each of the adjacent layers (e.g., 210, 220, 230, 240) provides for each of the layers to be adjacent to each other, but no provision is made to mechanically connect the adjacent layers so that any kinking or other weakening of the unidirectional fibers occurs. As discussed above, to maintain the non-mechanical nature of the connection between adjacent layers (e.g., 210, 220, 230, 240), they may be laminated together or otherwise adhered using a resinous material. For example, the adjacent layers may be saturated with resin and placed on each other while the resin(s) are uncured. In some aspects, the layer(s) may then be consolidated with rollers that apply pressure to the layer during the application stage to remove any air voids in the interface. It is contemplated that additional resin(s) may or may not be applied to join adjacent layers depending, for example, on the level of saturation of the individual fiber layers.

Referring now to FIGS. 3A-3E an application of a multilayer composite system for reinforcing a physical structure that includes a combination of unidirectional fiber and non-unidirectional fiber layers is illustrated. A combination of unidirectional and non-unidirectional fiber layers in a composite reinforcement system may be desirable in different applications, such as where an electrically non-conductive or heat insulating layers are preferred. For example, the physical structure (e.g., 330) being reinforced may be a conductive metal pipe or pipeline and it is desirable to separate a reinforcing layer of unidirectional carbon fibers adhered with a resin from the metal pipe that is being reinforced. In some aspects, the unidirectional fiber layer may include non-conductive fibers (e.g., glass, fibers, basalt fibers, aramid fibers), electrically and/or heat conductive fibers (e.g., metallic fibers, carbon fibers), or combinations thereof.

Similar to the unidirectional fiber composite systems described above, the unidirectional fiber layer may include unidirectional fibers that are arranged adjacent to and generally parallel to each other. The individual unidirectional fibers can be adhered to one another by a resin, where the individual fibers are generally non-mechanically connected to each other, but rather connected or adhered via the resin matrix that holds or bonds the unidirectional fibers together. Maintaining a non-mechanical connection, or at least minimizing mechanical interactions (e.g., direct mechanical interactions) between the individual unidirectional fibers, can be desirable so that the tensile properties of the unidirectional fibers are not compromised such that any potential reduction in the tensile strength of a unidirectional fiber is minimized. Tensile properties of the unidirectional fibers can be compromised due to kinking, bending, or other weakening effects that could occur through mechanical-type connections between adjacent unidirectional fibers.

While some aspects of composite systems may include unidirectional fiber layer(s) being adhered to one another or being used alone to reinforce a physical structure, it is contemplated that in certain aspects a unidirectional fiber layer (e.g., layer 370 in FIGS. 3C to 3E) may be adhered with a resinous material to non-unidirectional fiber layer (e.g., a fiber layer including woven fibers or mat fibers), such as layer 360 in FIGS. 3B to 3E). This can be desirable for certain applications of composite systems involving a repair or reinforcement of physical structures that are electrically and/or heat conductive (e.g., metal pipes; heat-conductive conveyances). Such repairs or reinforcements may have additional criteria for a proper reinforcement where a unidirectional fiber layer application using conductive fibers (e.g., metal fibers, carbon fibers), whether electrically or thermally conductive, is desirable but the unidirectional fiber reinforcement layer is preferably insulated from the conductive physical structure that is being repaired or reinforced. In such instances, it would be desirable to have a multi-layer composite system wrapped around or otherwise applied to the physical structure (e.g., pipe) that is being reinforced or repaired. The composite system can include the conductive unidirectional fiber layer (e.g., layer 370) being separated from the electrical and/or heat conductive physical structure (e.g., 330) by one or more insulating layers (e.g., such as fiberglass layer or a similar non-conductive layer 360).

In some aspects, an insulating layer (e.g., layer 360) may include unidirectional fibers. However, other types of fiber layers are also contemplated, such as an insulating woven fiber layer, other types of non-woven fiber layers, mat fiber layers, or fiber layers including combinations woven, non-woven, or mat fibers. The fiber materials for an electrical and/or heat insulating layer can include, among others, glass fibers (e.g., fiberglass), basalt fibers, aramid fibers, para-aramid synthetic fibers, or combinations thereof. The conductive unidirectional fiber layer, while being placed or wrapped around the insulating layer, is preferably adhered to the insulating layer with a resinous material rather than through a mechanical connection. The use of the resin to adhere the different layers can be desirable for maintaining the integrity and minimizing any compromise of to the tensile properties of the unidirectional fiber layer.

In some aspects, the insulating layer may directly separate the conductive unidirectional fiber layer and the conductive structure being reinforced. It is also contemplated that an optional third layer of material may be placed between the insulating layer and the conductive structure. In the exemplary aspect of a conductive structure (e.g., a metal pipe), a multi-layer composite system can comprise three layers combined into a single wrap. A first or top layer includes a conductive unidirectional fiber layer having its bottom side adhered to a top side of an insulating second layer. A third, or bottommost, layer can comprise an adhesive, a primer layer, an insulative coating, a gel material, and/or another coating that is in contact with a bottom side of the insulating second layer (i.e., the side that is not adhered to the unidirectional fiber layer). The three-layer composite system can then be applied to a conductive structure that is the subject of repair or reinforcement. The third, or bottommost, layer of the multi-layer composite system is placed in direct contact with the conductive structure as the composite system is applied to the structure. The composite system wrap will therefore include the insulating layer disposed in direct contact with the third layer and the unidirectional fiber layer disposed in direct contact with the insulating layer such that the insulating layer separates the unidirectional fiber layer and third layer.

In some aspects, the composite reinforcement system comprises an outer unidirectional fiber layer (e.g., unidirectional carbon fibers adhered with resin or other conductive fibers adhered with resin) and an insulating layer below the outer layer (e.g., a fiberglass layer made of unidirectional, woven, or mat fibers adhered with a resin) that is placed onto (e.g., wrapped) the physical structure that is being reinforced. An optional primer or adhesive layer that may or may not be another insulating-type layer can be placed between the physical structure and the insulating layer immediately below the outer layer. In some aspects, the third layer is a non-conductive layer that does not or resists conducting heat and/or electricity. Between each of the layers (e.g., the outer reinforcing layer above the insulating layer) resin only is applied or is present via the adhering resins for the individual layers such that each of the respective layers are non-mechanically connected to each other so that the strength of the unidirectional fibers is not decreased to kinking or other weakening of the fibers. It is also contemplated that in some aspects the insulating layer below the outer layer can be pre-impregnated with resin or it can be field impregnated with the resin.

Figure 3A:
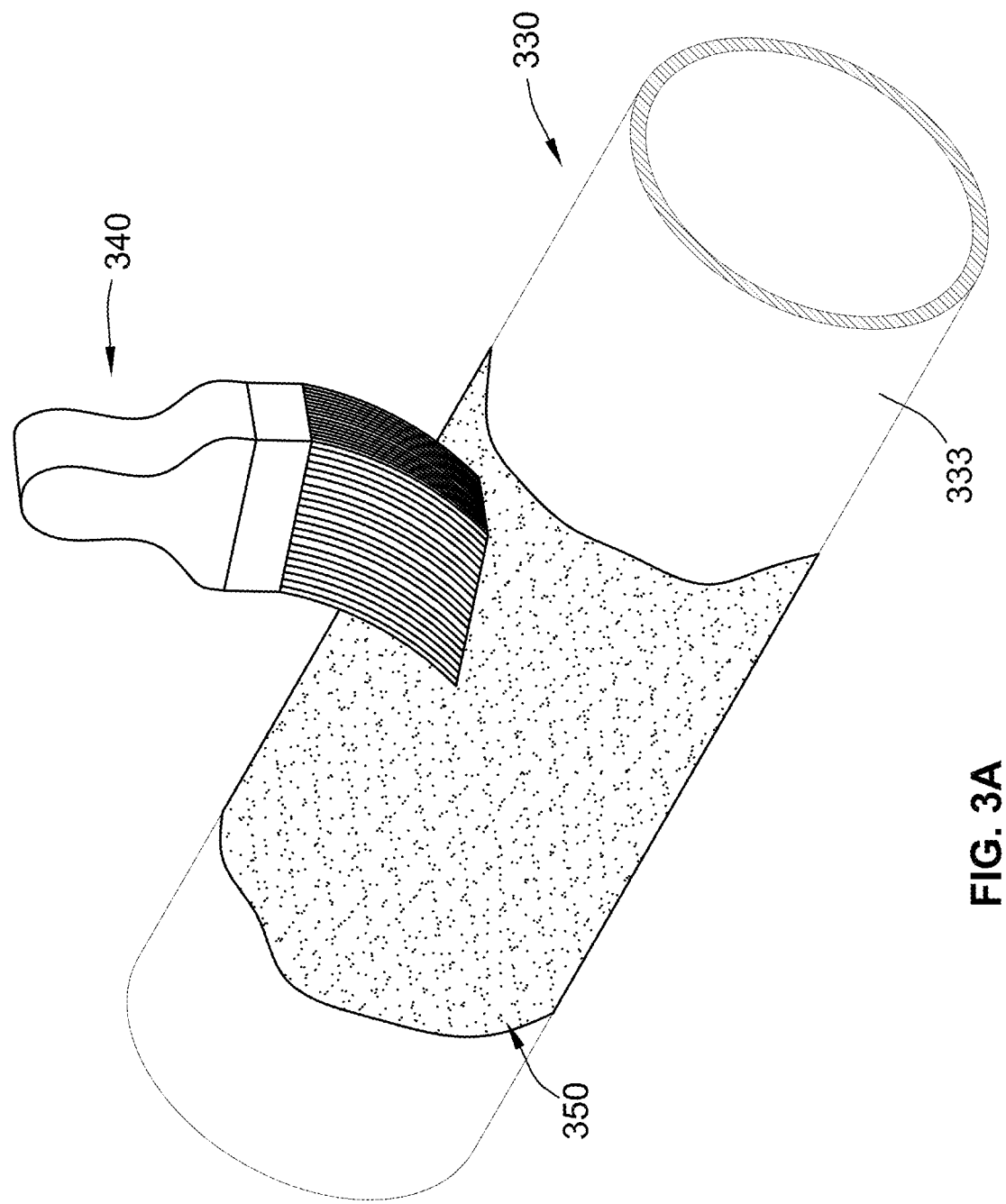
FIGS. 3A-3E illustrate an application of a multilayer composite system for reinforcing physical structure that includes a combination of unidirectional fiber and/or non-unidirectional fiber layers in accordance with aspects of the present invention.

In FIG. 3A, an example of the application of the primer layer 350 (or in some aspects an insulating primer layer, an insulating coating, or an insulating gel) to an outer surface 333 of a physical structure 330 is illustrated. The primer layer 350 may be applied or spread using a brush 340 or other types of application device for fluid or semi-fluid materials. After the primer layer 350 is applied, in FIG. 3B, an insulating layer 360, such as a resin-impregnated fiberglass layer or a layer that includes otherwise insulating fibers and/or resins, is applied above the primer layer 350, and thus, applied to the physical structure 330 being reinforced or repaired. The insulating layer 360 may be part of a roll-up kit 365 that includes a disposable plastic film applicator. Once the insulating layer is fully applied to the physical structure 330 above the optional primer layer, the resin-impregnated unidirectional fiber layer 370 is applied to the insulating layer 360. Similar to the insulating layer, the resin-impregnated unidirectional fiber layer 370 may be a part of a roll-up kit 375 that includes a disposable plastic film applicator. With only resin separating the insulating layer 360 and the outer resin-impregnated unidirectional fiber layer 370, the outer layer 370 is wrapped or otherwise applied to reinforce the physical structure 330.

In some aspects, layer 350 may not be applied in the field (e.g., is not brushed on) to a physical structure, but rather may be a part of a multilayer composite. For example, layer 350 could include a gel material that is part of a rolled up, uncured composite system where the gel was pre-adhered or pre-applied to the insulating layer 360 as part of making the roll-up kit 365.

Figure 3B:
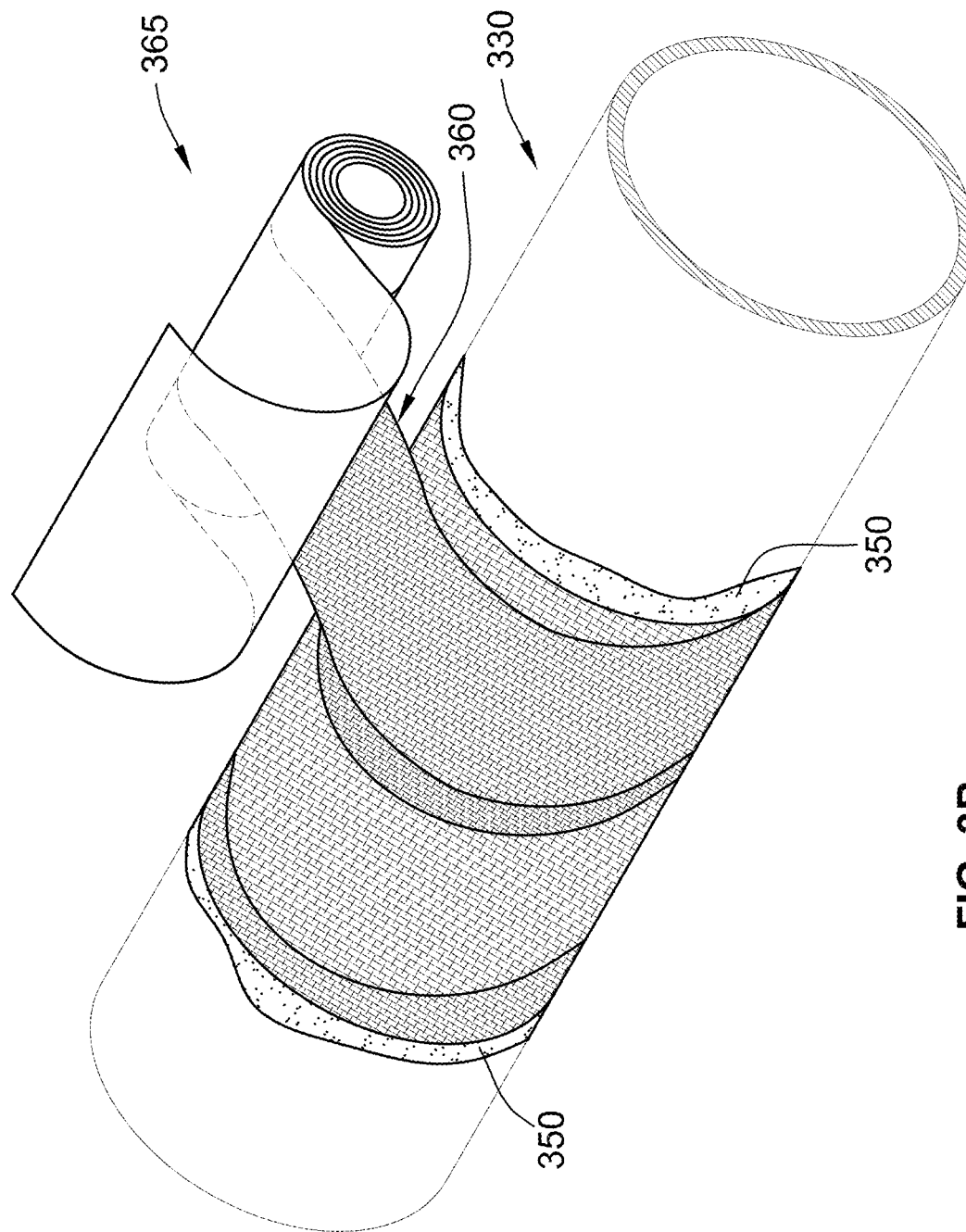
Figure 3C:
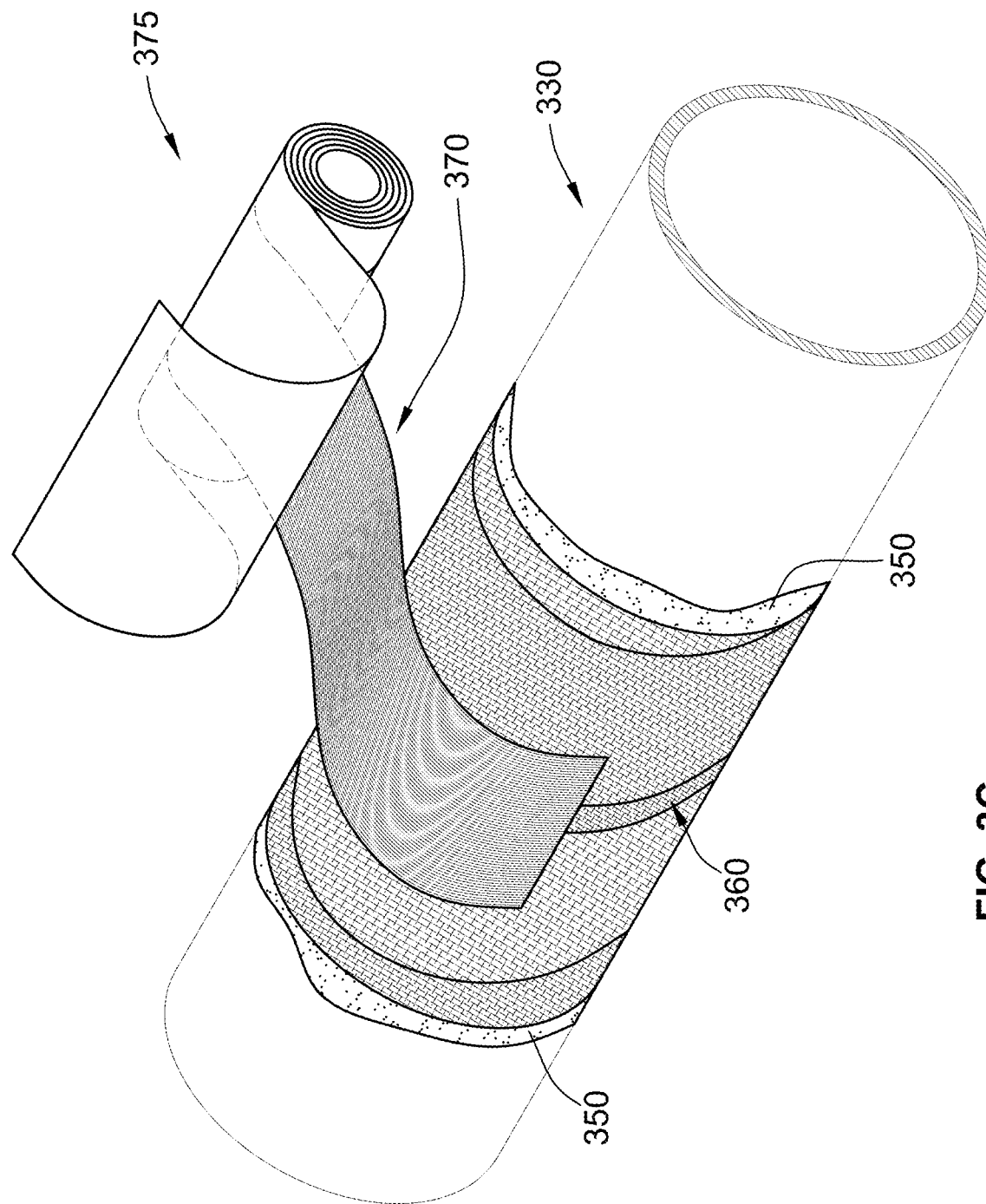
Figure 3D:
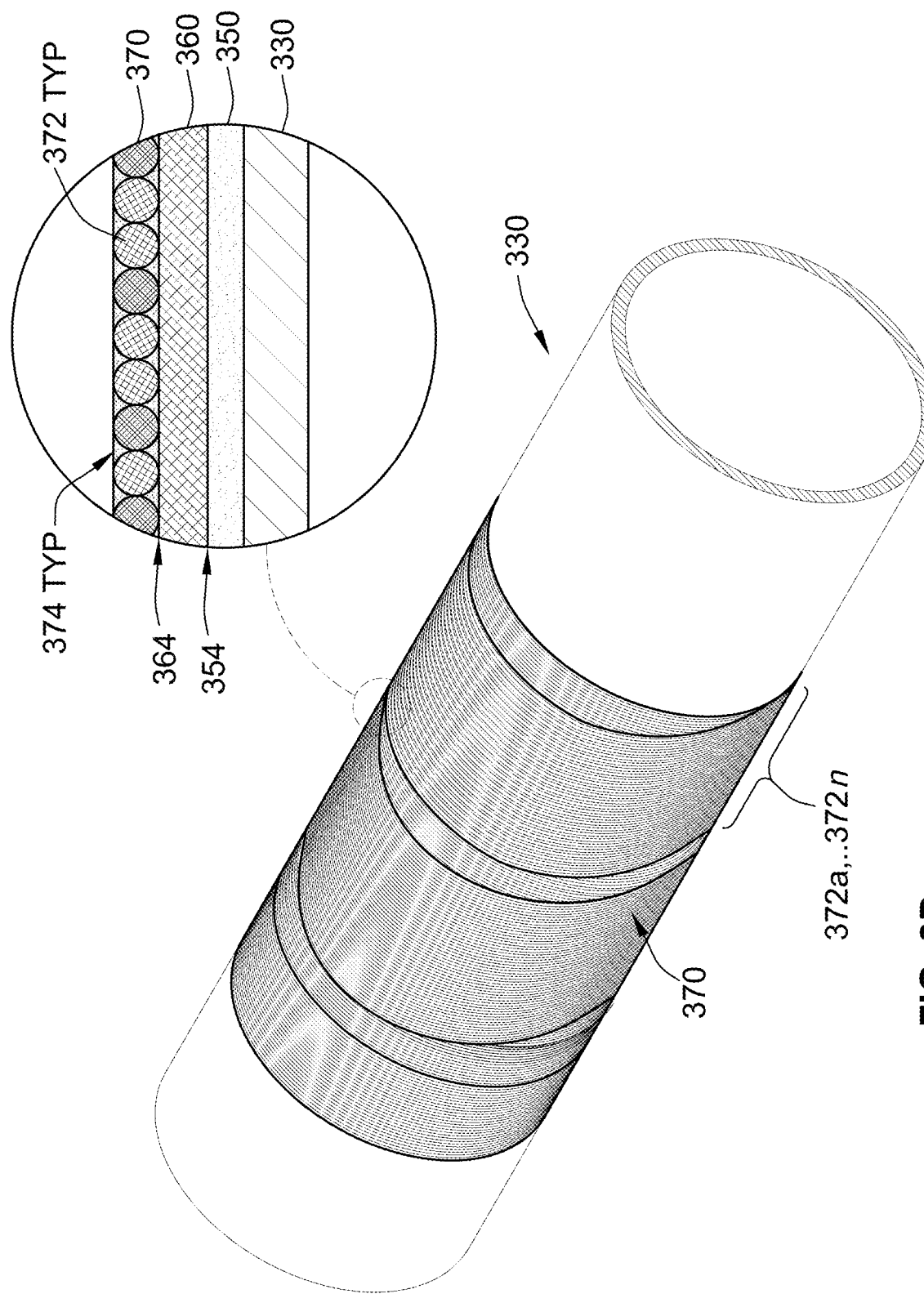
Figure 3E:
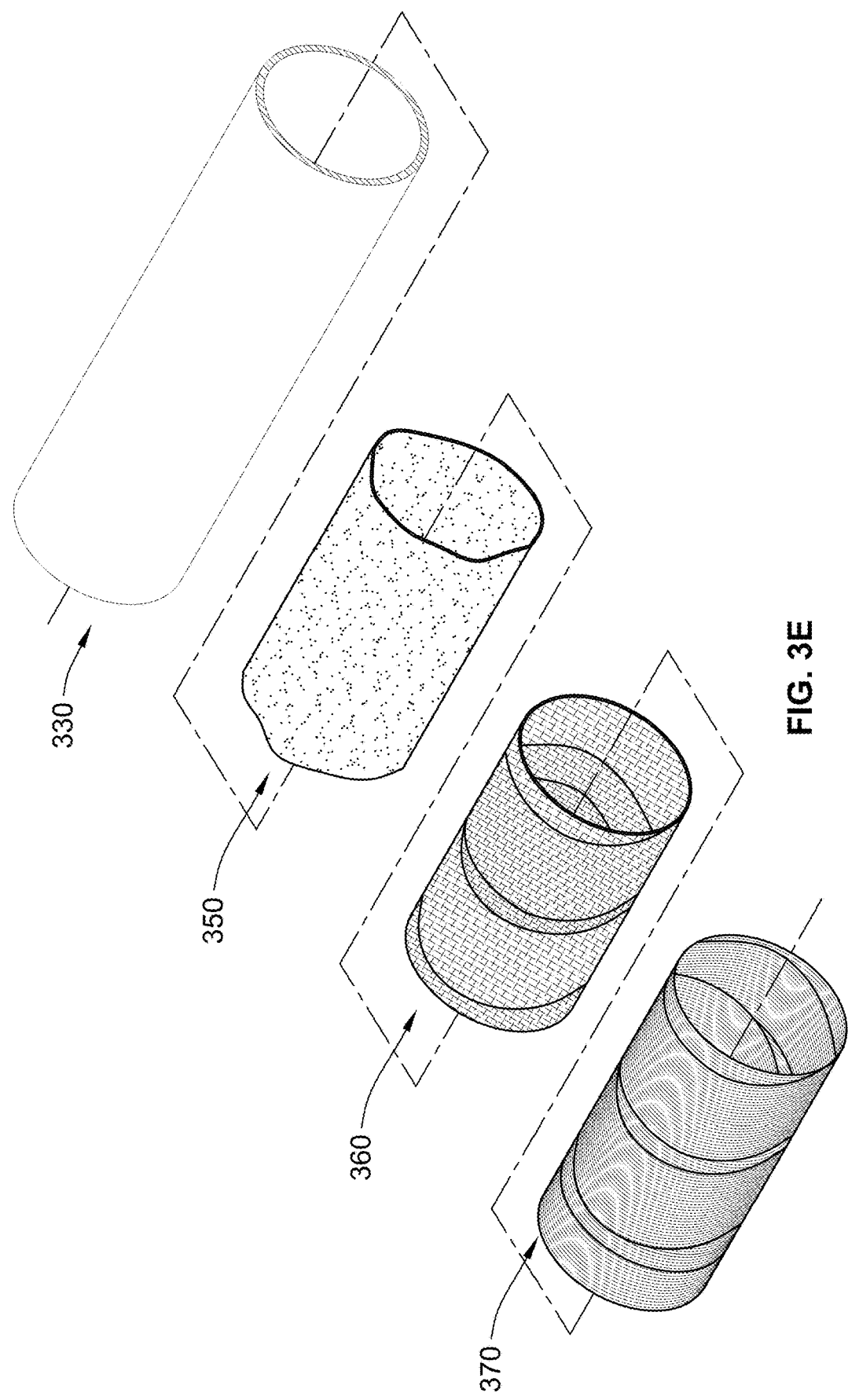

FIG. 3D illustrates one exemplary aspect of a finished multi-layer composite system, including an outer resin-impregnated unidirectional fiber layer 370, that reinforces a physical structure 330. While the top unidirectional fiber layer 370 may be illustrated extending nearly or over the lower layers, it is also contemplated that any conductive layers, such as a metal pipe being reinforced and a reinforcement layer including conductive materials (e.g., unidirectional carbon fibers, unidirectional metal fibers), will be fully separated by an intermediate insulating layer (e.g., layer 360) without any direct connection of the two conductive layers. The outer unidirectional fiber layer illustrated in FIG. 3D includes a plurality of generally parallel fibers 372a-372n that are adhered with a resin that fills the void space 374 between the individual fibers. Similarly, the interfaces 354, 364 also include resins so that there is a non-mechanical connection between adjacent layers, in particular, between the unidirectional fiber layers and any adjacent layers. FIG. 3E illustrates an exploded view of all the layers applied to the physical structure 330 in FIGS. 3A-3D including the optional primer layer 350, the insulating layer 360, and the outer unidirectional fiber layer 370.

It is contemplated that the individual layers of a multi-layer composite system (e.g., see FIGS. 2 and 3A-3E) are pre-adhered to one another such that when the composite systems are applied to a structure the application is effectively done a single application of the multi-layer system. For example, rather than each individual layer of the multi-layer system being individually applied to the physical structure undergoing a repair, each layer of the multi-layer composite system is already pre-adhered so that one single wrap is applied to the structure. The single wrap includes all the adhered layers of the composite system.

Figure 4:
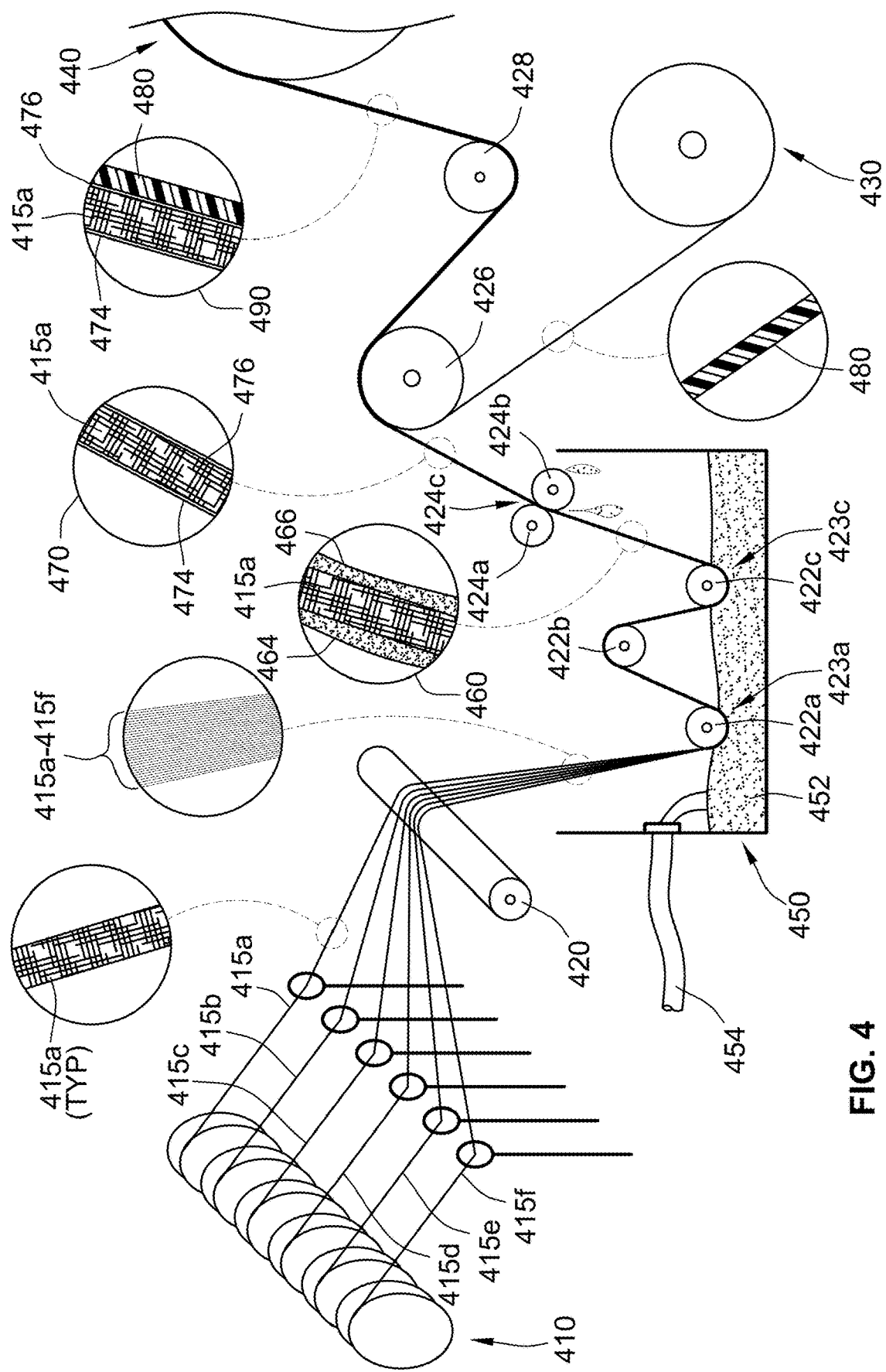
FIG. 4 illustrates an exemplary method and system for making a composite system including a plurality of unidirectional fibers and a resinous material for adhering the plurality of unidirectional fibers to each other in accordance with aspects of the present invention.

FIG. 4 illustrates an exemplary method and system for making an uncured composite system (e.g., a roll-up kit) that includes a plurality of unidirectional fibers and a resinous material for adhering the plurality of unidirectional fibers to each other. In some aspects, unidirectional fibers (e.g., 415a-415f) are stored on one or more spools 410. The unidirectional fibers on the individual spools may be single fibers, or more typically a group of fibers, that extended from the respective spool(s). The extended fibers are then aligned so that the plurality of unidirectional fibers are generally (e.g., almost or usually) parallel to each other as the fibers align at roller 420 to form a thin layer (e.g., the thickness of a single fiber diameter; the thickness of no more than several fiber diameters; the thickness of less than ten fiber diameters) of adjacent unidirectional fibers (e.g., 415a-415f).

The thin layer of adjacent, generally parallel, unidirectional fibers are then subsequently moved through rollers 422a-422c which are part of a resin application basin 450. The resin application basin 450 can have a resin supply hose 454 for discharging resin 452 into the basin 450. In some aspects, the resin application basin 450 may also be configured to heat the resin for better impregnation of fibers by reducing the viscosity of the resin. In some aspects, the adjacent unidirectional fibers 415a-415f are first exposed or impregnated with resin 452 at first exposure point 423a and then again at second exposure point 423c. The resin is evenly applied to the generally parallel fibers such that the immediately adjacent unidirectional fibers adhere to one another. In some aspects, the generally parallel extended unidirectional fibers can be submerged into the resinous material to apply the resin. The resinous material can also be applied in other ways (e.g., spraying, injecting, mechanically spreading) such that the resin is evenly applied across the entire width of the extended unidirectional fibers such that all the adjacent small-diameter fibers can be adhered to one another. Other comparable aspects of apply or impregnating the adjacent unidirectional fibers are contemplated.

During manufacturing, the unidirectional fibers (e.g., 415a-415f) are held in place mechanically through the use of guides and rollers as illustrated in FIG. 4. When the adjacent unidirectional fibers exit the basin 450 each of the fibers (e.g., 415a-415f) is coated with resin 464, 466 as illustrated in window 460. The resin coating might be a thicker coating than is desired for the finally manufactured uncured unidirectional fiber composite kit. In some aspects, the thick resin coating 464, 466 may be reduced at point 424c by running the resin-coating adjacent unidirectional fibers through rollers 424a, 424b to squeeze or remove any excess resin that is not desired for the finished product. Window 470 illustrates an aspect of an exemplary fiber (e.g., 415a) following a reduction in the resin coating 474, 476.

In some aspects, following the application of the resinous material 452 to the generally parallel unidirectional fibers (e.g., 415a-415f), the manufacturing process proceeds to adhere the formed unidirectional fiber layer (see exemplary fiber illustrated in window 470) to a temporary plastic film 480 used to store the composite system. The plastic film applicator 480 can be stored on a roll 430 and the formed unidirectional fiber layer can be applied to the film in an uncured state using a roller 426, though other methods of applying the layer and film are contemplated, as well. A cross-section of a single fiber in the formed layer of adhered unidirectional fibers is illustrated in window 490. The layer include the unidirectional fiber (e.g., 415a) having a lower resin coating 474 and an upper resin coating 476 that connects or adhered the resin-impregnated fiber to the plastic film applicator 480. In some aspects, after the formed layer of uncured unidirectional fiber composite extends about additional guides and/or rollers (e.g., 428), the manufactured product can be rolled up and stored on a roll 440 in its uncured state for subsequent processing based on commercial needs or until the composite system is ready to be unrolled and applied to reinforce or repair a physical structure.

In some aspects, the systems and methods illustrated by FIG. 4 can be modified. For example, a direct impregnation methods can be used where the resin is directly applied to the unidirectional fibers (e.g., 415a-415f) between two rollers positioned after roller 420. It is also contemplated that the resin may be applied to a polymer or paper tape which then transfers the resin to the unidirectional fibers (e.g., 415a-415f) rather than via resin application basin 450. Other configurations of the rollers illustrated in FIG. 4 that achieve a similar goal of applying resin to the unidirectional fibers are also contemplated.

In some aspects, roller 428 in FIG. 4 can include a protective film to minimize resin from adhering to the roller. It is also contemplated that a roll similar to roll 430 can store a polymer sheet that comes in between the resin-impregnated unidirectional fibers after roller 426 and before roller 428. The polymer sheet can then be taken off by another roller (not shown) after roller 428, but before the resin-impregnated unidirectional fibers are stored or wound onto roll 440.

In some aspects, it is desirable for several distinct unidirectional fiber layers to be adhered to each other to form a composite system, similar to what is illustrated and described for FIGS. 2 and 3A-3E and elsewhere herein. Such composite systems may have one or more longer and/or continuous layer(s) formed similar to the process illustrated in FIG. 4. Additional layer(s) can be formed through additional unidirectional fiber layer(s) being adhered at an angle to the longer layer(s).

Similar processes are also contemplated where several distinct layers are adhered to each other including unidirectional and non-unidirectional fiber layers. For example, similar to the processes and system described for FIG. 4, fiber layers already saturated with resinous material, whether unidirectional or non-unidirectional, can be placed one over another during the process. For example, a non-unidirectional impregnated layer may be placed on top of one or on top of many unidirectional layers. The process for impregnating non-unidirectional fibers is similar to that described for FIG. 4 without the use of a temporary plastic film like film 480 or the use of spools 410. The individual layers are then placed or laid on top of each other, either in a continuous process through roller or through a non-continuous process of adhering each individual layer one length at a time.

It is contemplated that in some aspects, the composite system can be applied to a physical structure, such as a pipe or column, using a tape-gun type system where a roll of the composite system, as illustrated for example in FIGS. 1A, 3B, and 3C, is placed into the tape-gun like device that is then subsequently used to apply the composite system to the structure.

The unidirectional fiber layer of the composite system that is described herein is fabricated so that the majority of the fibers run in one direction only. It is unique for some aspects of the composite system that for each distinct layer of unidirectional fibers that all of the unidirectional fibers in the layer run in the same direction such that no secondary fibers run in other directions (e.g., no secondary fibers are used to hold the primary fibers in place), as this could lead to a weakening of the tensile strength of primary fibers. For example, other composite system can often include a mechanical connection between the fibers, such as through woven or knitted fabrics or non-woven fabric where the fibers are entangled. Other mechanical connections of previous systems include braided fabrics, twisted or spun fabrics (e.g., a plurality of small-diameter fibers twisted together), stitching, cross-stitching, or weaving. In other aspects, the fibers have been connected through a hot melted fiber stitched axially and heated to melt into the fibers to keep them in place. In contrast, the presently described composite system with a plurality of unidirectional fibers is held together or adhered (e.g., bonded) through the stickiness and/or hardening of a resin applied to the plurality of fibers, with no stitching, weaving, or spinning that would create mechanical connections (e.g., frictional connection, other types of mechanical fastening) between the individual fibers.

Resins contemplated for the composite systems described herein can also include aliphatic or aromatic isocyanate-functionalized compounds. Use of composite materials having aliphatic isocyanate-functionalized resins that are contemplated by the present disclosure provide many desirable benefits over the aromatic resin. For example, use of aliphatic resins yield lower gas production rate during the curing process. More specifically aliphatic isocyanate-functionalized prepolymers of lower-percent isocyanate (NCO) will generate less carbon dioxide than prepolymers of higher-percent NCO. The formation of voids or bubbles compromises the structural integrity of composites. Effects of and problems associated with voids are detailed by, for example, Silvia Hernández Rueda, "Curing, Defects and Mechanical Performance of Fiber-Reinforced Composites," Universidad Politécnica De Madrid, Escuela Técnica Superior de Ingenieros de Caminos, Canales y Puertos (2013) (Doctoral Thesis) (198 pages); Mohamed A. Suhot et al., "The Effect of Voids on the Flexural Fatigue Performance of Unidirectional Carbon Fibre Composites," 16th Int'l Conf. on Composite Mat'ls (2007) (10 pages); Lenoe, Edward M., "Effect of voids on Mechanical Properties of Graphite Fiber Composites," prepared by AVCO Corporation and submitted to the U.S. Naval Air Systems Command under contract No. N00019-07-C-0242 (1970) (55 pages), the disclosures of which are each incorporated by reference in their entireties. Less carbon dioxide production and production rate during curing results in fewer voids in the cured resins, leading to more desirable mechanical properties such as an increased strength when the aliphatic isocyanate-functionalized resin is used for a composite reinforcement system.

The curing process (sometimes referred to as "wetting") of aliphatic resins generally takes longer than aromatic resins. The longer curing time allows gases produced during the curing process to permeate and escape the resin. This results in fewer voids in the cured resins, leading to more desirable mechanical properties, such as strength, when an aliphatic isocyanate-functionalized resin is used in a composite reinforcement system. In addition to a lower overall production of carbon dioxide, any carbon dioxide that is produced by aliphatic isocyanate-functionalized resin has a lower rate of production. When the carbon dioxide production rate is reduced, carbon dioxide can leave the curing resin by diffusing out of the system rather than forming bubbles or voids by nucleating. Additionally, the use of an aliphatic isocyanate-functionalized resin in a composite reinforcement system for a physical structure, such as a containment structure, conveyance structure, or a load-bearing structure, further minimizes laminate rise, which allows for more desirable mechanical properties such as increased strength by reducing voids and strain on the plies within the composite material or layers of an applied (e.g., wrapped) composite material. Moreover, the longer curing time and permeation of gasses produces less foam within the curing resin, thus reducing voids in the cured resin, inhibiting collapse of the voids in the curing and the cured resin, and increasing strength of the material.

A slower curing process also provides the desirable aspect of allowing for faster overall application of a composite reinforcement system. For example, faster-curing resins such as aromatic isocyanates can lead to production of foam on the curing surface, forcing the composite system away from the surface to be reinforced, possibly leading to unwanted voids within the reinforcement system. In order to reduce movement away from the surface, several layers are applied to the surface and then compressed for a period of time while the resin partially cures before the application of more layers to inhibit the effects of the rapid off-gassing. Layers will have to be applied and compressed in stages to properly repair and/or reinforce the surface. A desirable aspect of composite reinforcement systems employing aliphatic isocyanate-functionalized resins is that much greater numbers of layers can be applied to the physical structure that is being reinforced before the composite system will need compression, if compression is needed at all. The ability to apply greater numbers of layers to the physical structure without stopping results in valuable time savings during a repair or reinforcement of the physical structure, particularly where multiple layers of composite reinforcement are needed to meet the desired post-repair mechanical properties of the physical structure. Moreover, the lower amount of carbon dioxide produced and slower production of carbon dioxide also minimizes or even prevents a drop in the through-thickness modulus. The through-thickness modulus is a measure of strain transfer through the thickness of a system. Accordingly, use of aliphatic isocyanates also provides benefits to the composite reinforcement system because strain caused by expansion of the structure (e.g., expansion of a pipe under internal pressure) will be transferred through all layers of the composite reinforcement system which maintains or increases the overall effectiveness of the system.

Composite systems employing aliphatic isocyanate-functionalized resin materials can also provide enhanced physical properties of the cured composite reinforcement system. For example, the lower porosity of the resin increases permeability during and after curing. Further, use of aliphatic isocyanate-functionalized resin provides the composite reinforcement system with UV resistance. For example, aliphatic isocyanate-functionalized polyurethane thermoplastics and thermosets are more UV stable than aromatic isocyanate-functionalized thermoplastics and thermosets.

Employing an aliphatic resin can desirably allow a user to apply a desired number of layers over a longer period of time than aromatic resins or epoxies. In some embodiments, the layers are applied in about ten minutes prior to the end of the wrapping procedure or the application of compression to the composite reinforcement system. In some embodiments, the layers are applied for more than about five minutes prior to the end of the wrapping procedure or the application of compression to the composite reinforcement system. In some embodiments, the layers are applied for more than about ten minutes prior to the end of the wrapping procedure or the application of compression to the composite reinforcement system. In some embodiments, the layers are applied for more than about fifteen minutes prior to the end of the wrapping procedure or the application of compression to the composite reinforcement system. In some embodiments, the layers are applied for more than about twenty minutes prior to the end of the wrapping procedure or the application of compression to the composite reinforcement system. In some embodiments, the layers are applied for more than about thirty minutes prior to the end of the wrapping procedure or the application of compression to the composite reinforcement system. In some embodiments, the layers are applied for more than about forty-five minutes prior to the end of the wrapping procedure or the application of compression to the composite reinforcement system. In some embodiments, the layers are applied for more than about sixty minutes prior to the end of the wrapping procedure or the application of compression to the composite reinforcement system. In some embodiments, the layers are applied for more than about ninety minutes prior to the end of the wrapping procedure or the application of compression to the composite reinforcement system. In some embodiments, the layers are applied for more than about 120 minutes prior to the end of the wrapping procedure or the application of compression to the composite reinforcement system. In some embodiments, the layers are applied for more than about 180 minutes prior to the end of the wrapping procedure or the application of compression to the composite reinforcement system. In some embodiments, the layers are applied for more than about 240 minutes prior to the end of the wrapping procedure or the application of compression to the composite reinforcement system.

A benefit of a composite reinforcement system using aliphatic isocyanate-functionalized resin is a high-stiffness and high-strength reinforcement system that minimizes the overall thickness of the reinforced or repaired structure, even for applications where multiple layers of the composite reinforcement system are applied to the portion of the structure being reinforced. For example, the strength increase provides for lower overall thickness (e.g., fewer wraps) needed to soundly repair a structure. Additionally, a benefit of a composite reinforcement system using aliphatic isocyanate-functionalized resin is the ability to use thicker overall multi-ply composites without encountering issues such as delamination of the plies. For example, the thicker multi-ply composites lower the number of wraps that need to be applied to soundly repair a structure. Beneficially, fewer required wraps also reduces the cost of labor to soundly repair a structure.

In some aspects, additives can be included within an aliphatic isocyanate-functionalized resin, such as an aliphatic isocyanate-functionalized polyurethane resin, to alter at least one property of the resin. For example, additives can include silica, a hindered amine chain extender, or a hydroxy ethyl oxazolidine intermediate. In some embodiments, the altered property is the viscosity of the uncured resin. In some embodiments, the altered property is the thixotropy of the fluid. For example, fumed silica can be added to an aliphatic prepolymer mixture to alter or increase the thixotropy of the fluid. The addition of fumed silica increases the viscosity of the resin under low shear rates and lowers the viscosity at higher shear rates. In some embodiments, the additive reduces the amount of gas generated during the curing process. For example, hindered amine chain extender reduces the percentage of NCO in the prepolymer which, as stated above, reduces the amount of carbon dioxide generated during curing. In some embodiments, the additive reduces the rate of gas generation during curing. For example, hydroxy ethyl oxazolidine intermediate reacts with water to generate amines and alcohols, diverting the water from reacting with the isocyanate groups. These amines and alcohols then react with the isocyanate groups to complete the cure.

In some embodiments of the composite reinforcement systems using aliphatic isocyanate-functionalized resins, a plurality of unidirectional fibers (e.g., a carrier) is saturated with the resin prior to storage (e.g., "prepreg" systems). Beneficially, prepreg composite reinforcement systems employing aliphatic isocyanate-functionalized resins provide many desirable qualities over typical epoxy resins or aromatic resins. For example, aliphatic resins have a longer shelf-life than aromatic resins. The longer shelf-life makes prepreg aliphatic-resin composite systems more economically feasible, as well as makes repairs more effective because the composite system does not lose much flexibility and effectiveness during storage. Additionally, aliphatic resins cure over longer periods of time than aromatic resins. In some embodiments, it takes several days for the aliphatic resin to cure versus several hours for or aromatic resins to cure. Notably, this longer cure time allows for enhanced properties such as fewer voids within the cured resin and less mechanical strain created during the cure process.

Further, prepreg composite reinforcement systems employing aliphatic isocyanate-functionalized resins allow for more-accurate mixing of the components because the prepreg composite reinforcement systems are manufactured at a facility where controlled and reliable preparation of the systems and components is possible. For example, resins are mixed using more-accurately measured amounts of each component than field-mixed components, providing desired ratios between components of the epoxies. These accurate ratios provide for more controlled reactions during the cure process and more controlled performance of the composite reinforcement system. Additionally, the mixing and application of the resin to the plurality of unidirectional fibers (e.g., carrier) occurs under more-controlled conditions, such as humidity and temperature, to provide for more predictable performance at the manufacturing facility. Moreover, prepreg composite reinforcement systems allow for larger lot or batch sizes when mixing the resin. These larger lot sizes provide for more consistent chemistry and mechanical performance between prepreg composite reinforcement systems than the necessarily smaller-batch field-applied mixes.

Prepreg composite reinforcement systems employing aliphatic isocyanate-functionalized resins also provide for carrier benefits. For example, the thickness of plies of the carrier within a multi-plied carrier can be controlled. Additionally, plies of a multi-plied carrier may be individually saturated to provide generally uniform saturation of a carrier comprising a plurality of unidirectional fibers.

Prepreg composite reinforcement systems employing aliphatic isocyanate-functionalized resins also provide benefits to users. For example, users can quickly and effectively apply the composite reinforcement system to a surface without the need to mix chemicals and wait for the carrier to become saturated. Further, the enhanced pliability of the prepreg system when applied to the surface provides for better coverage and a more-secure fit. Additionally, there is less risk of user error when using prepreg systems. The user does not have to mix chemicals, ensure homogeneity of the mixture, apply the chemicals, ensure saturation of the carrier, etc. This leads to increased mechanical performance and predictability of the composite reinforcement system. Further, the ratio of carrier to resin can be optimized to increase performance of the system, control desired mechanical properties, extend shelf life, and reduce cost of the system.

In some embodiments of the composite reinforcement system, it may be desirable for a carrier to be saturated with resin immediately prior to application to the surface to be reinforced (e.g., field-applied systems). Beneficially, the use of field-applied composite reinforcement systems having aliphatic isocyanate-functionalized resins provides for extended shelf life. Additionally, the use of the longer cure period of the aliphatic isocyanate-functionalized resins provides for additional time to allow the resin to saturate the carrier prior to application. The longer cure time also allows the carrier to be more flexible during application to the surface to be reinforced, yielding a more secure application and enhanced mechanical properties of the cured reinforcement.

The composite reinforcement system with uncured resins can be stored or packaged as part of a repair kit. The kit includes, for example, a composite reinforcement system including a carrier and an aliphatic resin (e.g., an aliphatic polyurethane resin) sealed in a protective packaging such as a moisture-tight pouch. The composite reinforcement system can be a prepreg system where the carrier is impregnated with the aliphatic isocyanate-functionalized resin prior to storage. Alternatively, the composite reinforcement system can be a field-applied system. Beneficially, the protective packaging can be used as a container to mix or prepare the aliphatic resin and saturate the carrier. The kit can have a wide range of storage temperatures that will typically be determined by the type of aliphatic resin used.

According to an alternative embodiment A, a composite system for the reinforcement of physical structures includes a plurality of unidirectional fibers each having a longitudinal axis and a length. The plurality of unidirectional fibers are of approximately equal length and arranged with the respective longitudinal axes generally parallel to each other over a substantial portion of the length of each unidirectional fiber. The plurality of unidirectional fibers are non-mechanically connected. A resinous material adheres the plurality of unidirectional fibers to each other such that each one of the plurality of unidirectional fiber is adhered to at least one adjacent one of the plurality of unidirectional fibers along a substantial portion of the length of the adjacent one of the plurality unidirectional fibers.

According to an alternative embodiment B, the composite system of alternative A further includes that the resinous material is a self-curing epoxy that is initially uncured or initially partially cured.

According to an alternative embodiment C, the composite system of any one of alternatives A and B further includes that the unidirectional fibers are carbon fibers, glass fibers, basalt fibers, aramid fibers, para-aramid synthetic fibers (e.g., Kevlar®, poly-paraphenylene terephthalamide), metal fibers, or any combination thereof.

According to an alternative embodiment D, the composite system of any one of alternatives A to C further includes that the carbon fibers are polyacrylonitrile based, petroleum pitch based, or a combination thereof.

According to an alternative embodiment E, the composite system of any one of alternatives A to D further includes that the modulus of elasticity of the carbon fibers is between the range of about 12 to 30 Msi, about 30 to 50 Msi, about 50 to 80 Msi, about 80 to 120 Msi, and/or about 120 to 150 Msi.

According to an alternative embodiment F, the composite system of any one of alternatives A to E further includes that the modulus of elasticity of the glass fibers is between the range of about 5 to 7 Msi, about 7 to 10 Msi, and/or about 10 to 13 Msi.

According to an alternative embodiment G, the composite system of any one of alternatives A to F further includes that the modulus of elasticity of the basalt fibers is between the range of about 5 to 8 Msi, about 8 to 12 Msi, and/or about 12 to 16 Msi.

According to an alternative embodiment H, the composite system of any one of alternatives A to G further includes that the resinous material includes any one, two, or multicomponent thermosets comprising either polyurethanes, moisture-curable polyurethanes, cationically curable epoxies, dual-stage epoxies, polyamides, polyureas, polyimides, polyoxazolidones, polycarbonates, polyethers, polysiloxanes, polyolefins, polybutadienes, silanes, vinylesters, polythiols, polyamines, polyols, polyisocyanates, polyisobutylenes, or any viable combination thereof.

According to an alternative embodiment I, the composite system of any one of alternatives A to H further includes that the resinous material includes a polyurethane material (such as a moisture curable polyurethane material) having an aliphatic prepolymer chemically configured to activate and harden after removal from a generally inert environment and exposure to moisture, such as moisture in air. Alternatively, the composite system of any one of alternatives A to H further includes that the resinous material is an aliphatic isocyanate-functionalized resin.

According to an alternative embodiment J, the composite system of any one of alternatives A to I further includes that the aliphatic prepolymer is an aliphatic isocyanate prepolymer.

According to an alternative embodiment K, the composite system of any one of alternatives A to J further includes that the resinous material is a moisture-curable urethane resin.

According to an alternative embodiment L, the composite system of any one of alternatives A to K further includes that the unidirectional fibers are preimpregnated with the moisture-curable urethane resin and the composite system being stored in an uncured or partially cured state in a moisture-tight enclosure.

According to an alternative embodiment M, the composite system of any one of alternatives A to L further includes that the ratio of unidirectional fibers to resinous material is between the range by volume of about a 60:40 to a 50:50 ratio, about a 50:50 to a 40:60 ratio, about a 40:60 to a 30:70 ratio, about a 30:70 to a 20:80 ratio, about a 40:60 to 80:20 ratio, about a 40:60 to 75:25 ratio, and/or about a 60:40 to a 20:80 ratio.

According to an alternative embodiment N, the composite system of any one of alternatives A to L further includes that the ratio of unidirectional fibers to resinous material is between the ranges of about a 80:20 to a 20:80 ratio by volume.

According to an alternative embodiment O, the composite system of any one of alternatives A to L further includes that the number of unidirectional fibers per unit width, as measured generally perpendicular to the longitudinal axes of the adjacent unidirectional fibers, is between the range of about 100 to 200 fibers per inch, about 200 to 500 fibers per inch, about 500 to 1000 fibers per inch, about 1000 to 2000 fibers per inch, about 2000 to 4000 fibers per inch, and/or about 4000 to 8500 fibers per inch.

According to an alternative embodiment P, the composite system of any one of alternatives A to O further includes that the overall width of the composite system, as measured generally perpendicular to the longitudinal axes of the adjacent plurality of unidirectional fibers, is between the range of about 0.5 to 24 inches (including subranges within this range).

According to an alternative embodiment Q, the composite system of any one of alternatives A to P further includes that the resinous material is initially uncured or initially partially cured and that the resinous material is curable by heat curing, moisture curing, ultraviolet light exposure, and/or electron beam curing.

According to an alternative embodiment R, the composite system of any one of alternatives A to Q further includes that the resinous material is heat curable at temperatures exceeding about 400 degrees F.

According to an alternative embodiment S, the composite system of any one of alternatives A to Q further includes that the resinous material is curable at temperatures below about 40 degrees F.

According to an alternative embodiment T, the composite system of any one of alternatives A to S further includes that the adjacent plurality of unidirectional fibers form a unidirectional fiber layer. The resinous material is configured to adhere and/or bond the unidirectional fiber layer to concrete, wood, steel, titanium, brass, bronze, copper, aluminum, or any combinations thereof.

According to an alternative embodiment U, the composite system of any one of alternatives A to T further includes that the adjacent plurality of unidirectional fibers form a unidirectional fiber layer, and that a disposable plastic film applicator has a width greater than or equal to an overall width of the unidirectional fiber layer as measured generally perpendicular to the longitudinal axes of the plurality of unidirectional fibers. The disposable plastic film applicator further has a length approximately equal to the length of the plurality of unidirectional fibers. The resinous material temporarily adheres the unidirectional fiber layer to the disposable plastic film applicator.

According to an alternative embodiment V, the composite system of any one of alternatives A to U further includes a central core upon which the disposable plastic film applicator with the resinous material adhering the unidirectional fiber layer thereon is wound.

According to an alternative embodiment W, the composite system of any one of alternatives A to V further includes that the plurality of unidirectional fibers include a combination of carbon fibers and fiberglass.

According to an alternative embodiment X, the composite system of any one of alternatives A to W further includes that in response to the resinous material being fully cured, the composite system of the resinous material and the plurality of unidirectional fibers has a tensile strength along the longitudinal axes in the range of one or more of about 30 to 50 ksi, about 50 to 100 ksi, about 100 to 200 ksi, about 200 to 400 ksi, and/or about 400 to 600 ksi.

According to an alternative embodiment Y, the composite system of any one of alternatives A to X further includes that in response to the resinous material being fully cured, the composite system including the resinous material and the plurality of unidirectional fibers has a Shore D hardness value in the range of one or more of about 60 to 70, about 70 to 80, about 80 to 90, and/or about 90 to 100.

According to an alternative embodiment Z, a repair kit including the composite system of any one of alternatives A to Y further includes a moisture tight enclosure configured to store the composite system.

According to an alternative embodiment AA, a structural reinforcement assembly of any one of alternatives A to Z further includes that the composite system is configured to be applied to the physical structure. The physical structure being reinforced includes one of a pipe, a tank, a concrete beam, a concrete slab, a concrete column, a concrete square, a steel column, a steel beam, a wall, or a floor slab.

According to an alternative embodiment AB, the structural reinforcement system of any one of alternatives A to AA further includes that the composite system is wrapped around a pipeline assembly in one or more overlapping layers.

According to an alternative embodiment AC, the structural reinforcement system of any one of alternatives A to AB further includes that the composite system is wrapped around a pipeline assembly in one or more overlapping layers. The wrapped pipeline assembly includes the composite system increasing the outer diameter of the pipeline assembly by less than about 0.05 inches, by between about 0.05 to 0.25 inches, by between about 0.25 to 0.5 inches, by between about 0.5 to 0.75 inches, by between about 0.75 to 1 inch, by between about 1 to 2 inches, and/or by between about 2 to 4 inches.

According to an alternative embodiment AD, the structural reinforcement system of any one of alternatives A to AC further includes that the composite system is applied to an inner surface extending about the circumference on the interior side of a pipeline assembly in one or more overlapping layers. The interior of the pipeline assembly including the composite system decreasing the inner diameter of the pipeline assembly by less than about 0.05 inches, by between about 0.05 to 0.25 inches, by between about 0.25 to 0.5 inches, by between about 0.5 to 0.75 inches, by between about 0.75 to 1 inch, by between about 1 to 2 inches, and/or by between about 2 to 4 inches.

According to an alternative embodiment AE, the structural reinforcement system of any one of alternatives A to AD further includes that the composite system is applied in one or more layers to an outer surface of a concrete column having a circular cross-section, a square cross-section, a rectangular cross-section, or any polygonal cross-sectional shape. The application of the composite system to the concrete column increases the respective outer diameter, outer cross-sectional length, or the outer cross-sectional width of the cross-section of the concrete column by less than about 0.1 inches, by between about 0.1 to 0.5 inches, by between about 0.5 to 1 inch, by between about 1 to 2 inches, and/or by between about 2 to 4 inches.

According to an alternative embodiment AF, the structural reinforcement system of any one of alternatives A to AE further includes that the composite system is applied in one or more layers to a steel web surface of a steel flange column. The steel web has a thickness. The application of the composite system to steel web surface increases the overall thickness of the web by less than 1.25 times the thickness of the steel web, by between about 1.25 to 1.5 times the thickness of the steel web, and/or by between about 1.5 to 2 times the thickness of the steel web.

According to an alternative embodiment AG, the structural reinforcement system of any one of alternatives A to AF further includes that the composite system is applied in one or more layers to a steel flange surface of a steel flange column. The steel flange has a thickness. The application of the composite system to the steel flange surface increases the overall thickness of the flange by less than 1.25 times the thickness of the steel flange, by between about 1.25 to 1.5 times the thickness of the steel flange, and/or by between about 1.5 to 2 times the thickness of the steel flange.

According to an alternative embodiment AH, the structural reinforcement system of any one of alternatives A to AG further includes the composite system being applied in one or more layers around a hollow steel tube column having a steel tube wall thickness. The application of the composite system to the hollow steel tube column increases an overall thickness of the tube wall by less than 1.25 times the thickness of the steel tube wall, by between about 1.25 to 1.5 times the thickness of the steel tube wall, and/or by between about 1.5 to 2 times the thickness of the steel tube wall.

According to an alternative embodiment AI, a method of manufacturing a composite system for the reinforcement of physical structures is described. The composite system includes a plurality of unidirectional fibers and a resinous material adhering the plurality of unidirectional fibers to each other. The method comprises providing a first supply roll including a disposable applicator film. A first plurality of individual supply spools of first unidirectional fibers is provided. Each unidirectional fiber has a first longitudinal axis. The first individual supply spools of first unidirectional fibers are arranged adjacent to each other. The disposable applicator film from the first supply roll is extended to a second collector roll. The first unidirectional fibers from the first individual supply spools are extended such that the first unidirectional fibers are parallel to each other and are disposed above or below the disposable applicator film. During the extending of the disposable applicator film and the extending of the first unidirectional fibers, the resinous material is applied to the first unidirectional fibers along the width of each of the first unidirectional fibers such that the resinous material is generally evenly applied and impregnates the first unidirectional fibers such that the first unidirectional fibers adhere to each other. The resin impregnated first unidirectional fibers are adhered to and/or placed on the disposable applicator film. The adhered first unidirectional fibers are generally parallel to each other. Each of the first unidirectional fibers are adhered to at least one adjacent one of the first unidirectional fibers along a substantial portion of the adjacently adhered fibers such that the first unidirectional fibers are non-mechanically bound to each other.

According to an alternative embodiment AJ, the method of alternative AI further includes providing a second plurality of individual supply spools of second unidirectional fibers. Each of the second unidirectional fibers has a second longitudinal axis. The second unidirectional fibers are extended from the second individual supply spools such that the second longitudinal axes are generally parallel to each other. The second unidirectional fibers are further disposed above and/or below the extended first unidirectional fibers. The second longitudinal axes of the extended second unidirectional fibers traverse above and/or below the extended first unidirectional fibers at a first angle to the first longitudinal axes. During the extending of the second unidirectional fibers, resinous material is applied to the second unidirectional fibers along the width of each of the second unidirectional fibers such that the resinous material is generally evenly applied and impregnates the second unidirectional fibers such that the second unidirectional fibers adhere to each other. The resin impregnated second unidirectional fibers are pressed to the resin impregnated first unidirectional fibers. The adhered second unidirectional fibers are generally parallel to each other. Each of the second unidirectional fibers are adhered to at least one adjacent one of the second unidirectional fibers along a substantial portion of the adjacently adhered fibers such that the second unidirectional fibers are non-mechanically bound to each other.

According to an alternative embodiment AK, the method of any one of alternatives AI to AJ further includes that after the pressing of the second unidirectional fibers to the first unidirectional fibers, the first unidirectional fibers define a first plane and the second unidirectional fibers define a second plane such that the first plane is generally parallel to the second plane and the first longitudinal axes of the first unidirectional fibers are skew to the second longitudinal axes of the second unidirectional fibers. The smallest angle between any one of the first longitudinal axes of the first unidirectional fibers and any one of the second longitudinal axes of the second unidirectional fibers being in between the range of about zero to 15 degrees, about 15 to 30 degrees, about 30 to 45 degrees, about 45 to 60 degrees, about 60 to 75 degrees, and/or about 75 to 90 degrees (or any combinations of these ranges).

According to an alternative embodiment AL, the method of any one of alternatives AI to AK further includes that after the pressing of the second unidirectional fibers to the first unidirectional fibers, the first unidirectional fibers define a first plane and the second unidirectional fibers define a second plane such that the first plane is generally parallel to the second plane and the first longitudinal axes of the first unidirectional fibers are skew to the second longitudinal axes of the second unidirectional fibers, the smallest angle between any one of the first longitudinal axes of the first unidirectional fibers and any one of the second longitudinal axes of the second unidirectional fibers being about 15 degrees, about 30 degrees, about 45 degrees, about 60 degrees, about 75 degrees, and/or about 90 degrees.

According to an alternative embodiment AM, the method of any one of alternatives AI to AL further includes that the first unidirectional fibers each have a first diameter and the second unidirectional fibers each have a second diameter. The first diameter is different from the second diameter.

According to an alternative embodiment AN, the method of any one of alternatives AI to AM further includes providing a third plurality of individual supply spools of third unidirectional fibers. Each of the third unidirectional fiber has a third longitudinal axis. The third unidirectional fibers extend from the third individual supply spools such that the third longitudinal axes of the third unidirectional fibers are generally parallel to each other. The third unidirectional fibers are disposed above or below the extended second unidirectional fibers such that the second unidirectional fibers are disposed between the first unidirectional fibers and the third unidirectional fibers. The third longitudinal axes of the third unidirectional fibers traverse above or below the extended second unidirectional fibers at a second angle to the first longitudinal axes and a third angle to the second longitudinal axes. The second angle is different than the third angle. During the extending of the third unidirectional fibers, resinous material is applied to the third unidirectional fibers along the width of each of the third unidirectional fibers such that the resinous material is generally evenly applied and impregnates the third unidirectional fibers such that the third unidirectional fibers adhere to each other. The resin impregnated third unidirectional fibers is pressed to the resin impregnated second unidirectional fibers. The third unidirectional fibers are generally parallel to each other. Each of the third unidirectional fibers are adhered to at least one adjacent one of the third unidirectional fibers along a substantial portion of the adjacently adhered fibers such that the third unidirectional fibers are non-mechanically bound to each other.

According to an alternative embodiment AO, the method of any one of alternatives AI to AN further includes that after the pressing of the third unidirectional fibers to the second unidirectional fibers, the third unidirectional fibers define a third plane and the second unidirectional fibers define a second plane such that the third plane is generally parallel to the second plane and the third longitudinal axes of the third unidirectional fibers are skew to the second longitudinal axes of the second unidirectional fibers. The smallest angle between any one of the second longitudinal axes of the second unidirectional fibers and any one of the third longitudinal axes of the third unidirectional fibers being in between the range of about zero to 15 degrees, about 15 to 30 degrees, about 30 to 45 degrees, about 45 to 60 degrees, about 60 to 75 degrees, and/or about 75 to 90 degrees (or any combinations of these ranges).

According to an alternative embodiment AP, the method of any one of alternatives AI to AO further includes that after the pressing of the third unidirectional fibers to the second unidirectional fibers, the third unidirectional fibers define a third plane and the second unidirectional fibers define a second plane such that the third plane is generally parallel to the second plane and the third longitudinal axes of the third unidirectional fibers are skew to the second longitudinal axes of the second unidirectional fibers. The angle between any one of the second longitudinal axes of the second unidirectional fibers and any one of the third longitudinal axes of the third unidirectional fibers are about 15 degrees, about 30 degrees, about 45 degrees, about 60 degrees, about 75 degrees, and/or about 90 degrees.

According to an alternative embodiment AQ, the method of any one of alternatives AI to AP further includes that the first unidirectional fibers each have a first diameter, the second unidirectional fibers each have a second diameter, and the third unidirectional fibers each having a third diameter. At least one of the first diameter, the second diameter, and the third diameter are a different than the other two diameters.

According to an alternative embodiment AR, the method of any one of alternatives AI to AQ further includes providing a third plurality of individual supply spools of third unidirectional fibers. Each of the third unidirectional fiber have a third longitudinal axis. The third unidirectional fibers extend from each of the third individual supply spools such that the third longitudinal axes of the third unidirectional fibers are generally parallel to each other. The third unidirectional fibers are disposed above or below the extended second unidirectional fibers such that the second unidirectional fibers are disposed between the first unidirectional fibers and the third unidirectional fibers. The third longitudinal axes of the third unidirectional fibers traverse above or below the extended second unidirectional fibers generally parallel to the first longitudinal axes. During the extending of the third unidirectional fibers, applying resinous material to the third unidirectional fibers along the width of each of the third unidirectional fibers such that the resinous material is generally evenly applied and impregnates the third unidirectional fibers such that the third unidirectional fibers adhere to each other. The resin impregnated third unidirectional fibers is pressed to the resin impregnated second unidirectional fibers. The third unidirectional fibers are generally parallel to each other. Each of the third unidirectional fibers are adhered to at least one adjacent one of the third unidirectional fibers along a substantial portion of the adjacently adhered fibers such that the third unidirectional fibers are non-mechanically bound to each other.

According to an alternative embodiment AS, a composite system for the reinforcement of physical structures includes a plurality of first unidirectional fibers each having a first longitudinal axis and a first length. The plurality of first unidirectional fibers are of approximately equal length and arranged with the respective first longitudinal axes generally parallel to each other over a substantial portion of the first length of each first unidirectional fiber. A plurality of second unidirectional fibers each have a second longitudinal axis and a second length. The plurality of second unidirectional fibers are of approximately equal length and arranged with the respective second longitudinal axes generally parallel to each other over a substantial portion of the second length of the second unidirectional fibers. The second length is less than the first length. A resinous material adheres the plurality of first unidirectional fibers to each other such that each of the plurality of first unidirectional fibers is adhered to at least one adjacent one of the plurality of first unidirectional fibers along a substantial portion of the first length of the adjacent first unidirectional fibers thereby forming a first unidirectional fiber layer of generally non-mechanically connected first unidirectional fibers to define a first plane. The resinous material further adheres the plurality of second unidirectional fibers to each other such that each of the plurality of second unidirectional fibers is adhered to at least one adjacent one of the plurality of second unidirectional fibers along a substantial portion of the second length of the adjacent second unidirectional fibers thereby forming a second unidirectional fiber layer of generally non-mechanically connected second unidirectional fibers to define a second plane. The plurality of second unidirectional fibers are oriented such that any one of the second longitudinal axes in the second plane is skew to any one of the first longitudinal axes in the first plane. The first unidirectional fiber layer and the second unidirectional fiber layer are non-mechanically connected.

According to an alternative embodiment AT, the composite system of alternative AS further includes a plurality of third unidirectional fibers each having a third longitudinal axis and a third length. The plurality of third unidirectional fibers are of approximately equal length and arranged with the respective third longitudinal axes generally parallel to each other over a substantial portion of the third length of the third unidirectional fibers. The resinous material further adheres the plurality of third unidirectional fibers to each other such that each of the plurality of third unidirectional fibers is adhered to at least one adjacent one of the plurality of third unidirectional fibers along a substantial portion of the third length of the adjacent third unidirectional fibers thereby forming the third unidirectional fiber layer defining a third plane. The resinous material further adheres the first unidirectional fiber layer to the second unidirectional fiber layer and the second unidirectional fiber layer to the third unidirectional fiber layer. The plurality of third unidirectional fibers are oriented such that any one of the third longitudinal axes in the third plane is skew to any one of the first longitudinal axes in the first plane and further skew to any one of the second longitudinal axes in the first plane. The third unidirectional fiber layer and the second unidirectional fiber layer are non-mechanically connected.

According to an alternative embodiment AU, the composite system of any one of alternatives AS to AT further includes that the smallest angle between any one of the second longitudinal axes of the second unidirectional fibers and the third longitudinal axes of the third unidirectional fibers is between the range of about zero to 15 degrees, about 15 to 30 degrees, about 30 to 45 degrees, about 45 to 60 degrees, about 60 to 75 degrees, and/or about 75 to 90 degrees (or any combinations of these ranges).

According to an alternative embodiment AV, the composite system of any one of alternatives AS to AU further includes that the smallest angle between any one of the second longitudinal axes of the second unidirectional fibers and any one of the third longitudinal axes of the third unidirectional fibers is about 15 degrees, about 30 degrees, about 45 degrees, about 60 degrees, about 75 degrees, and/or about 90 degrees.

According to an alternative embodiment AW, the composite system of any one of alternatives AS to AV further includes that the first unidirectional fibers each have a first diameter, the second unidirectional fibers each have a second diameter, and the third unidirectional fibers each having a third diameter. At least one of the first diameter, the second diameter, and the third diameter are different than the other two diameters.

According to an alternative embodiment AX, the composite system of any one of alternatives AS to AW further includes a plurality of third unidirectional fibers each having a third longitudinal axis and a third length. The plurality of third unidirectional fibers are approximately equal in length and arranged with the third longitudinal axes generally parallel to each other over a substantial portion of the third length of the third unidirectional fibers. The resinous material further adheres the plurality of third unidirectional fibers to each other such that each of the plurality of third unidirectional fibers is adhered to at least one adjacent one of the plurality of third unidirectional fibers along a substantial portion of the length of the adjacent third unidirectional fibers thereby forming the third unidirectional fiber layer defining a third plane. The resinous material further adheres the first unidirectional fiber layer to the second unidirectional fiber layer and the second unidirectional fiber layer to the third unidirectional fiber layer. The plurality of third unidirectional fibers are oriented such that any one of the third longitudinal axes in the third plane is skew to any one of the first longitudinal axes in the first plane and further skew to any one of the second longitudinal axes in the second plane. The smallest angle between any one of the third longitudinal axes and any one of the first longitudinal axes is about zero degrees. The third unidirectional fiber layer and the second unidirectional fiber layer are non-mechanically connected.

According to an alternative embodiment AY, the composite system of any one of alternatives AS to AX further includes a disposable film having a width greater than an overall width of the adjacent plurality of first unidirectional fibers. The width is measured generally perpendicular to the longitudinal axes of the plurality of first unidirectional fibers. The disposable film further has a length approximately equal to the length of the plurality of first unidirectional fibers. The resinous material temporarily adheres the plurality of first unidirectional fibers, the plurality of second unidirectional fibers, or the plurality of third unidirectional to the disposable film.

According to an alternative embodiment AZ, the composite system of any one of alternatives AS to AY further includes that the resinous material is a self-curing epoxy that is initially partially cured or uncured.

According to an alternative embodiment BA, the composite system of any one of alternatives AS to AZ further includes that the first unidirectional fibers, the second unidirectional fibers, and/or the third unidirectional fibers are carbon fibers, fiberglass, basalt fibers, aramid fibers, para-aramid synthetic fibers (e.g., Kevlar®, poly-paraphenylene terephthalamide), metal fibers, or any combination thereof.

According to an alternative embodiment BB, the composite system of any one of alternatives AS to BA further includes that the carbon fibers are polyacrylonitrile based, petroleum pitch based, or a combination thereof.

According to an alternative embodiment BC, the composite system of any one of alternatives AS to BB further includes that the resinous material includes polyurethanes, polyamides, polyureas, polyimides, polyoxazolidones, polycarbonates, polyethers, polysiloxanes, polyolefins, polybutadienes, silanes, vinylesters, polythiols, polyamines, polyols, polyisocyanates, polyisobutylenes, cationics, or any viable combination thereof.

According to an alternative embodiment BD, the composite system of any one of alternatives AS to BC further includes that the resinous material is a moisture-curable urethane resin.

According to an alternative embodiment BE, the composite system of any one of alternatives AS to BD further includes that the first unidirectional fibers, the second unidirectional fibers, and/or the third unidirectional fibers are impregnated with the moisture-curable urethane resin. The composite system is stored in an uncured state or a partially cured state in a moisture tight enclosure.

According to an alternative embodiment BF, the composite system of any one of alternatives AS to BE further includes that the ratio of unidirectional fibers to resinous material is between the range by volume of about a 60:40 to a 50:50 ratio, about a 50:50 to a 40:60 ratio, about a 40:60 to a 30:70 ratio, about a 30:70 to a 20:80 ratio, about a 40:60 to 80:20 ratio, about a 40:60 to 75:25 ratio, and/or about a 60:40 to a 20:80 ratio.

According to an alternative embodiment BG, the composite system of any one of alternatives AS to BF further includes that the number of unidirectional fibers per unit width as measured generally perpendicular to the longitudinal axes of the adjacent unidirectional fibers is between the range of about 100 to 200 fibers per inch, about 200 to 500 fibers per inch, about 500 to 1000 fibers per inch, about 1000 to 2000 fibers per inch, about 2000 to 4000 fibers per inch, and/or about 4000 to 8500 fibers per inch.

According to an alternative embodiment BH, the composite system of any one of alternatives AS to BG further includes that the overall width of the composite system as measured generally perpendicular to the first longitudinal axes is between the range of about 0.5 inches to 24 inches (including subranges thereof).

According to an alternative embodiment BI, the composite system of any one of alternatives AS to BH further includes that the resinous material is initially uncured or initially partially cured. The resinous material is curable by heat curing, moisture curing, ultraviolet light exposure, and/or electron beam curing.

According to an alternative embodiment BJ, the composite system of any one of alternatives AS to BI further includes that the resinous material is heat curable at temperatures exceeding about 400 degrees F.

According to an alternative embodiment BK, the composite system of any one of alternatives AS to BJ further includes that wherein the resinous material is curable at temperatures below about 40 degrees F.

According to an alternative embodiment BL, the composite system of any one of alternatives AS to BK further includes that the resinous material is configured to adhere or bond at least one of the plurality of unidirectional fiber layers to concrete, wood, steel, titanium, brass, bronze, copper, aluminum, or any combination thereof.

According to an alternative embodiment BM, the composite system of any one of alternatives AS to BL further includes a central core upon which the disposable film with the resinous material adhering the plurality of unidirectional fibers thereon is wound.

According to an alternative embodiment BN, the composite system of any one of alternatives AS to BM further includes that the plurality of first unidirectional fibers, second unidirectional fibers, and/or third unidirectional fibers includes a combination of carbon fibers and fiberglass.

According to an alternative embodiment BO, a kit including the composite system of any one of alternatives AS to BN further includes that the kit further comprising a moisture tight enclosure configured to store the composite system.

According to an alternative embodiment BP, a composite system for the reinforcement of physical structures includes a first unidirectional fiber layer including a plurality of non-mechanically connected first unidirectional fibers each having a first longitudinal axis and a first length. The plurality of first unidirectional fibers are of approximately equal length and arranged with the respective first longitudinal axes generally parallel to each other over a substantially the entire first length of each first unidirectional fiber. The plurality of first unidirectional fibers includes electrically and/or heat conductive materials. The plurality of first unidirectional fibers are adhered to each other by a resinous material such that each of the plurality of first unidirectional fibers is adhered to at least one adjacent one of the plurality of first unidirectional fibers along substantially the entire first length of an adjacent first unidirectional fiber. A second insulating fiber layer is adhered to the first unidirectional fiber layer by the resinous material and/or another resinous material. The second insulating layer separates the electrically and/or heat conductive material(s) in the first unidirectional fiber layer from direct contact with an electrically and/or heat conductive physical structure being reinforced by the composite system.

According to an alternative embodiment BR, the composite system of alternative BP further includes that the plurality of first unidirectional fibers are non-metallic fibers, metal fibers, carbon fibers, or any combinations thereof; and/or wherein the second insulting fiber layer includes glass fibers, basalt fibers, aramid fibers, para-aramid synthetic fibers (e.g., Kevlar®, poly-paraphenylene terephthalamide), or any combinations thereof.

According to an alternative embodiment BS, the composite system of any one of alternatives BP to BR further includes that the carbon fibers are polyacrylonitrile based, petroleum pitch based, or any combinations thereof.

According to an alternative embodiment BT, the composite system of any one of alternatives BP to BS further includes that the second insulating fiber layer includes unidirectional fibers, woven fibers, non-woven fibers, mat fibers, or any combinations thereof.

According to an alternative embodiment BU, the composite system of any one of alternatives BP to BT further includes a third layer. The third layer is separated from the first unidirectional fiber layer by the second insulating fiber layer. The third layer is in contact with the second insulating fiber layer. The third layer is a primer, a coating, a gel, an insulator, or any combinations thereof. The third layer is adapted to be applied directly to the electrical and/or heat conductive physical structure.

According to an alternative embodiment BV, the composite system of any one of alternatives BP to BU further includes that the resinous material is a moisture-cured resin.

According to an alternative embodiment BW, the composite system of any one of alternatives BP to BV further includes that the composite system is stored in an uncured or partially cured state in a moisture-tight and/or air-tight enclosure.

According to an alternative embodiment BX, the composite system of any one of alternatives BP to BW further includes that the resinous material is a urethane resin.

According to an alternative embodiment BY, a kit for forming the composite system of any one of alternatives BP to BX includes the first unidirectional fiber layer, the second insulating fiber layer, the third layer, the resinous material(s), or any combinations thereof.

According to an alternative embodiment BZ, the composite system, methods, or kits of any of the preceding alternatives A to BY include that the resinous material is a moisture-cured resin.

According to an alternative embodiment CA, the composite system, methods, or kits of any of the preceding alternatives A to BZ include that the composite system is stored in an uncured or partially cured state in a moisture-tight and/or air-tight enclosure.

According to an alternative embodiment CB, the composite system, methods, or kits of any of the preceding alternatives A to CA include that the resinous material is a urethane resin While this disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the disclosure.

What is claimed is:

1. A repair kit for reinforcement of a physical structure, comprising:
    a pouch defining a moisture-tight enclosure; and
    a plurality of non-mechanically connected unidirectional carbon fibers located within the enclosure, each carbon fiber of the plurality of non-mechanically connected unidirectional carbon fibers being preimpregnated and adhered to an adjacent unidirectional carbon fiber of the plurality of non-mechanically connected unidirectional carbon fibers by a resinous material comprising a moisture-curable prepolymer, the resinous material being in a partially-cured state within the moisture-tight enclosure, the modulus of elasticity of the unidirectional carbon fibers being in a range of about 12 Msi to 150 Msi,
    wherein the resinous material, after removal from the pouch, is configured to transition to a fully-cured and hardened state on the physical structure in response to exposure to moisture.

2. The repair kit of claim 1, wherein the resinous material includes a polyurethane material.

3. The repair kit of claim 1, wherein the moisture-curable prepolymer includes an isocyanate-functionalized prepolymer.

4. The repair kit of claim 3, wherein the isocyanate-functionalized prepolymer is an aliphatic isocyanate-functionalized polyurethane prepolymer, an aliphatic isocyanate-functionalized polyurea prepolymer, an aliphatic isocyanate-functionalized polyurea-polyurethane hybrid prepolymer, or an aliphatic isocyanate-functionalized polyamide prepolymer.

5. The repair kit of claim 1, wherein a ratio of fibers to resinous material is between a range of about a 40:60 to a 80:20 by volume.

6. The repair kit of claim 1, wherein the plurality of non-mechanically connected unidirectional carbon fibers and the resinous material are provided in the pouch as part of a roll.

7. The repair kit of claim 6, further including a disposable film attached to the plurality of non-mechanically connected unidirectional carbon fibers via the partially-cured resinous material to keep adjacent unidirectional carbon fiber layers within the roll from attaching to each other.

8. The repair kit of claim 1, wherein the physical structure is a concrete structure or a metal structure.

9. The repair kit of claim 1, wherein the moisture-curable prepolymer is an aliphatic moisture-curable prepolymer.

10. The repair kit of claim 1, wherein the plurality of non-mechanically connected unidirectional carbon fibers are non-mechanically connected by the resinous material forming a matrix that bonds the unidirectional carbon fibers together such that there is no other connection between the unidirectional carbon fibers.

11. A repair kit for the reinforcement of a physical structure, comprising:
    a sealed package defining a moisture-tight enclosure;
    a first unidirectional carbon fiber layer including a plurality of first non-mechanically connected unidirectional carbon fibers located within the moisture-tight enclosure, the modulus of elasticity of the first unidirectional carbon fibers being in the range of about 12 Msi to 150 Msi;
    a second fiber layer including a plurality of second fibers located within the moisture-tight enclosure, the second fiber layer overlaying the first fiber layer;
    a resinous material preimpregnating and adhering the plurality of first non-mechanically connected unidirectional carbon fibers to each other such that each of the plurality of first non-mechanically connected unidirectional carbon fibers is adhered to at least one adjacent one of the plurality of first non-mechanically connected unidirectional carbon fibers, the resinous material further preimpregnating the plurality of second fibers, the resinous material adhering the first unidirectional carbon fiber layer to the second fiber layer,
    wherein the resinous material comprises a moisture-curable prepolymer that is stored in a partially-cured state within the moisture-tight enclosure, the moisture-curable prepolymer being configured to be fully-cured in response to the resinous material being exposed to moisture while the first and second fibers are adhered to the physical structure after removal from the sealed package.

12. The repair kit of claim 11, wherein the resinous material includes a polyurethane material.

13. The repair kit of claim 11, further comprising a disposable film temporarily adhered to one of the first unidirectional carbon fiber layer or the second fiber layer while in the package.

14. The repair kit of claim 11, wherein the resinous material is configured to adhere the first unidirectional carbon fiber layer and the second fiber layer to concrete, wood, steel, titanium, brass, bronze, copper, aluminum, or any combination thereof.

15. The repair kit of claim 11, wherein the plurality of second fibers is unidirectional fibers, the resinous material adhering the plurality of second fibers to each other such that each of the plurality of second fibers is adhered to at least one adjacent one of the plurality of second fibers.

16. The repair kit of claim 11, wherein the moisture-curable prepolymer is an isocyanate-functionalized prepolymer.

17. The repair kit of claim 16, wherein the isocyanate-functionalized prepolymer is an aliphatic isocyanate-functionalized polyurethane prepolymer, an aliphatic isocyanate-functionalized polyurea prepolymer, an aliphatic isocyanate-functionalized polyurea-polyurethane hybrid prepolymer, or an aliphatic isocyanate-functionalized polyamide prepolymer.

18. The repair kit of claim 11, wherein the second fiber layer includes carbon fibers.

19. The repair kit of claim 11, wherein the moisture-curable prepolymer is an aliphatic moisture-curable prepolymer.

20. A repair kit for reinforcement of a physical structure, comprising:
- a pouch defining a moisture-tight enclosure; and
- a plurality of non-mechanically connected unidirectional fibers located within the moisture-tight enclosure, the plurality of non-mechanically connected unidirectional fibers being preimpregnated with a resinous material comprising an aliphatic moisture-curable polyurethane, the resinous material being in a partially-cured state within the moisture-tight enclosure,
- wherein the resinous material, after removal from the pouch, is configured to transition to a fully-cured and hardened polyurethane material in response to exposure to moisture while being adhered to the physical structure.

21. The repair kit of claim 20, wherein each of the non-mechanically connected unidirectional fibers are adhered to an adjacent unidirectional fiber by the resinous material.

22. The repair kit of claim 20, further including a disposable film attached to the plurality of non-mechanically connected unidirectional fibers via the partially-cured resinous material to keep adjacent fiber layers within a roll from attaching to each other.

23. The repair kit of claim 20, wherein the plurality of non-mechanically connected unidirectional fibers are non-mechanically connected by the resinous material forming a matrix that bonds the unidirectional fibers together such that there is no other connection between the unidirectional fibers.

24. A method of making the repair-kit of claim 1 to be used for reinforcing physical structures, comprising:
- moving the plurality of non-mechanically connected unidirectional carbon fibers through the resinous material for developing a moisture-curable polymer;
- permitting the resinous material to only partially cure such that plurality of fibers are adhered together to form a flexible fiber layer;
- placing the fiber layer within an enclosure of the repair-kit package that is substantially moisture-free; and
- sealing the enclosure while the resinous material remains in a partially-cured state and in a substantially moisture-free environment.

25. The method of claim 24, further including winding the fiber layer around a spool prior to placing the fiber layer within the enclosure.

26. A method of reinforcing a physical structure using the repair kit of claim 1, comprising:
- removing a fiber layer from a moisture-tight package, the fiber layer includes the plurality of non-mechanically connected unidirectional carbon fibers adhered together through the resinous material that is in a partially-cured state at the time of removal from the moisture-tight package, the resinous material being a polyurethane;
- applying the fiber layer to a surface of the physical structure such that the fiber layer adheres to the surface due to the partially-cured state of the resinous material; and
- adding moisture to the fiber layer to transition the resinous material into a fully-cured state and to harden the fiber layer on the surface of the physical structure.

27. The method of claim 26, wherein the resinous material is an aliphatic isocyanate-functionalized polyurethane prepolymer in the partially-cured state.

* * * * *